United States Patent
Kim et al.

(10) Patent No.: US 11,063,717 B2
(45) Date of Patent: Jul. 13, 2021

(54) CHANNEL STATE INFORMATION TRANSMITTING METHOD AND USER EQUIPMENT, AND CHANNEL STATE INFORMATION RECEIVING METHOD AND BASE STATION

(71) Applicant: LG ELECTRONICS INC., Seoul (KR)

(72) Inventors: Eunsun Kim, Seoul (KR); Kijun Kim, Seoul (KR); Hanbyul Seo, Seoul (KR); Yunjung Yi, Seoul (KR); Suckchel Yang, Seoul (KR); Seonwook Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/323,926

(22) PCT Filed: Aug. 8, 2017

(86) PCT No.: PCT/KR2017/008561
§ 371 (c)(1),
(2) Date: Feb. 7, 2019

(87) PCT Pub. No.: WO2018/030756
PCT Pub. Date: Feb. 15, 2018

(65) Prior Publication Data
US 2019/0215119 A1    Jul. 11, 2019

Related U.S. Application Data

(60) Provisional application No. 62/491,272, filed on Apr. 28, 2017, provisional application No. 62/455,474, (Continued)

(51) Int. Cl.
*H04L 5/00* (2006.01)
*H04W 24/10* (2009.01)
(Continued)

(52) U.S. Cl.
CPC .............. *H04L 5/0048* (2013.01); *H04L 1/06* (2013.01); *H04L 5/005* (2013.01); *H04L 5/0094* (2013.01);
(Continued)

(58) Field of Classification Search
CPC . H04W 52/42; H04W 52/242; H04W 52/245; H04W 56/003; H04W 56/0045;
(Continued)

(56) References Cited

U.S. PATENT DOCUMENTS

2009/0186613 A1* 7/2009 Ahn ................. H04L 5/0057
455/434
2012/0076017 A1* 3/2012 Luo ................. H04L 1/0027
370/252

(Continued)

FOREIGN PATENT DOCUMENTS

| WO | 2016089146 | 6/2016 |
|----|------------|--------|
| WO | 2016114868 | 7/2016 |

OTHER PUBLICATIONS

PCT International Application No. PCT/KR2017/008561, Written Opinion of the International Searching Authority dated Nov. 16, 2017, 22 pages.
(Continued)

*Primary Examiner* — Michael Thier
*Assistant Examiner* — Prince A Mensah
(74) *Attorney, Agent, or Firm* — Lee, Hong, Degerman, Kang & Waimey

(57) ABSTRACT

When a user equipment transmits a random access preamble, a base station transmits a random access response to the user
(Continued)

equipment in response to the random access preamble. The base station may include CSI measurement configuration information in the random access response and then transmit the random access response. The user equipment may perform a CSI report on the basis of the CSI measurement configuration information.

8 Claims, 12 Drawing Sheets

Related U.S. Application Data filed on Feb. 6, 2017, provisional application No. 62/371,848, filed on Aug. 8, 2016.

(51) Int. Cl.
  *H04L 1/06* (2006.01)
  *H04W 74/08* (2009.01)
  *H04B 7/00* (2006.01)
  *H04W 88/02* (2009.01)

(52) U.S. Cl.
  CPC ....... *H04W 24/10* (2013.01); *H04W 74/0833* (2013.01); *H04B 7/00* (2013.01); *H04W 88/02* (2013.01)

(58) Field of Classification Search
  CPC . H04W 24/10; H04W 74/0833; H04W 88/02; H04L 1/0026; H04L 1/0027; H04L 1/0025; H04L 5/0057; H04L 5/005; H04L 1/06; H04L 5/0048; H04L 5/0094
  See application file for complete search history.

(56) References Cited

U.S. PATENT DOCUMENTS

| | | | |
|---|---|---|---|
| 2013/0142134 A1* | 6/2013 | Zhu | H04L 5/0082 370/329 |
| 2015/0098347 A1* | 4/2015 | Guo | H04L 5/0053 370/252 |
| 2016/0050648 A1 | 2/2016 | Seo et al. | |
| 2016/0227548 A1 | 8/2016 | Nimbalker et al. | |
| 2016/0329945 A1* | 11/2016 | Onggosanusi | H04B 7/0626 |
| 2017/0134130 A1* | 5/2017 | Li | H04L 1/0026 |
| 2018/0019855 A1* | 1/2018 | Zhang | H04L 1/00 |
| 2019/0037609 A1* | 1/2019 | Harada | H04W 88/02 |

OTHER PUBLICATIONS

ZTE, "Further considerations on CSI feedback for MTC enhancement", 3GPP TSG RAN WG1 Meeting #83, R1-156667, Nov. 2015, 8 pages.

* cited by examiner

CHANNEL STATE INFORMATION TRANSMITTING METHOD AND USER EQUIPMENT, AND CHANNEL STATE INFORMATION RECEIVING METHOD AND BASE STATION

CROSS-REFERENCE TO RELATED APPLICATIONS

This application is the National Stage filing under 35 U.S.C. 371 of International Application No. PCT/KR2017/008561, filed on Aug. 8, 2017, which claims the benefit of U.S. Provisional Application No. 62/371,848, filed on Aug. 8, 2016, 62/455,474, filed on Feb. 6, 2017, and 62/491,272, filed on Apr. 28, 2017, the contents of which are all hereby incorporated by reference herein in their entireties.

TECHNICAL FIELD

The present invention relates to a wireless communication system. In particular, the present invention relates to a method and apparatus for transmitting/receiving channel state information.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies using high frequency bands.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of transmitting channel state information (CSI) by a user equipment in a wireless communication system. The method includes: transmitting a random access preamble; receiving a random access response as a response to the random access preamble; and performing a CSI report. The random access response includes CSI measurement configuration information. The CSI report is performed based on the CSI measurement configuration information.

According to another aspect of the present invention, provided herein is a user equipment for transmitting channel state information (CSI) in a wireless communication system. The user equipment includes a radio frequency (RF) unit, and a processor configured to control the RF unit. The processor is configured to: control the RF unit to transmit a random access preamble; control the RF unit to receive a random access response as a response to the random access preamble; and control the RF unit to perform a CSI report.

The random access response may include CSI measurement configuration information. The CSI report may be performed based on the CSI measurement configuration information.

According to another aspect of the present invention, provided herein is a method of receiving channel state information (CSI) by a base station in a wireless communication system. The method includes: receiving a random access preamble from a user equipment; transmitting a random access response as a response to the random access preamble to the user equipment; and receiving a CSI report from the user equipment. The random access response includes CSI measurement configuration information. The CSI report is associated with the CSI measurement configuration information.

According to another aspect of the present invention, provided herein is a base station for receiving channel state information (CSI) in a wireless communication system. The base station includes a radio frequency (RF) unit, and a processor configured to control the RF unit. The processor is configured to: control the RF unit to receive a random access preamble from a user equipment; control the RF unit to transmit a random access response as a response to the random access preamble to the user equipment; and control the RF unit to receive a CSI report from the user equipment. The random access response may include CSI measurement configuration information. The CSI report may be associated with the CSI measurement configuration information.

In each aspect of the present invention, the user equipment may calculate the CSI, based on received quality of a CSI reference signal (CSI-RS), a synchronization signal, a demodulation reference signal for receiving a physical broadcast channel, a demodulation reference signal for receiving system information, or system information. The CSI report may include the calculated CSI.

In each aspect of the present invention, the CSI measurement configuration information may include CSI reference signal (CSI-RS) configuration information for the CSI report.

In each aspect of the present invention, the user equipment may further receive downlink control information including a CSI request. The CSI report may be performed according to the CSI request.

The above technical solutions are merely some parts of the examples of the present invention and various examples into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to an example of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate examples of the invention and together with the description serve to explain the principle of the invention.

MODE FOR THE INVENTION

Figure 1:
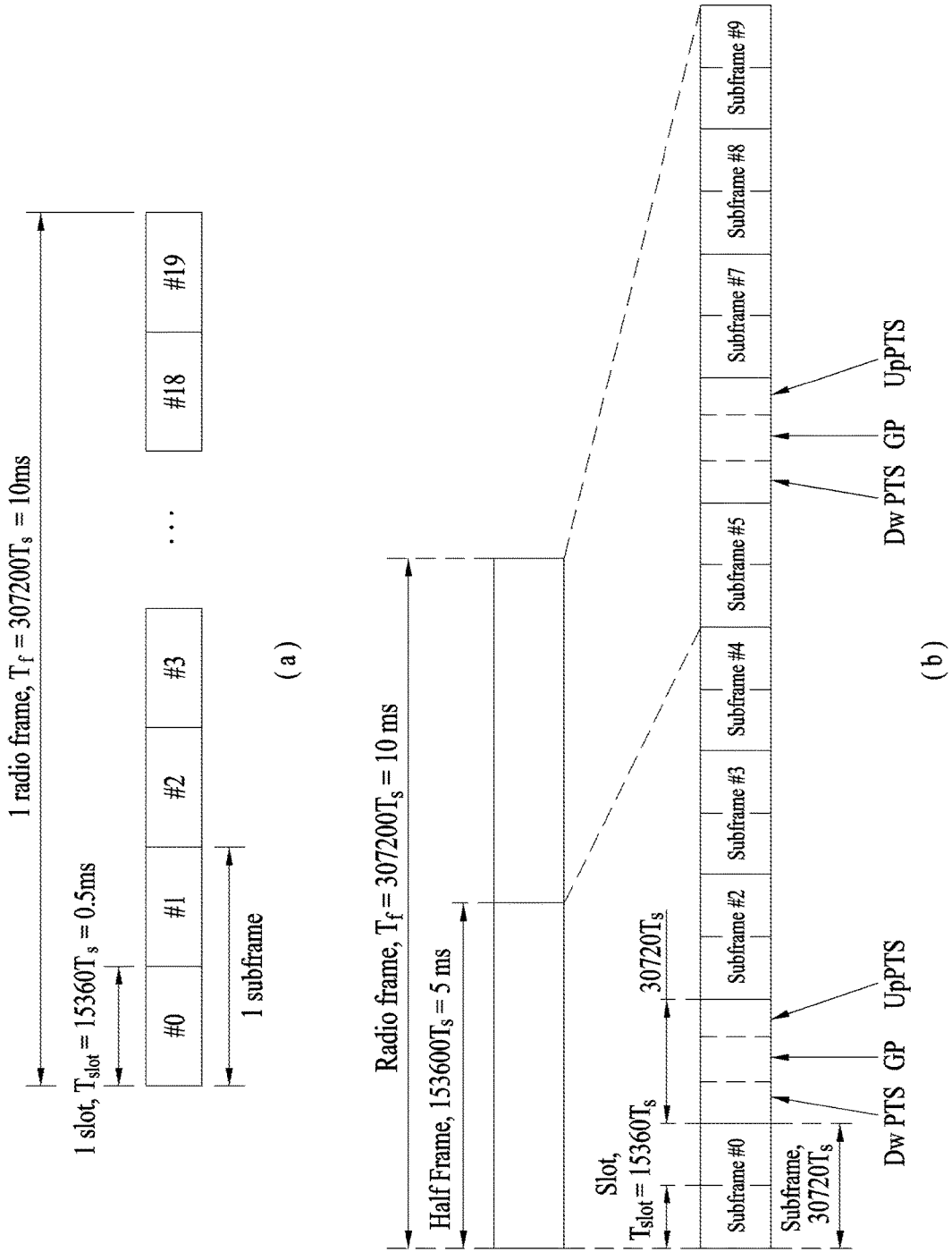
FIG. 1 illustrates the structure of a radio frame used in the LTE/LTE-A based wireless communication system.

Reference will now be made in detail to the exemplary examples of the present invention, examples of which are illustrated in the accompanying drawings. The detailed description, which will be given below with reference to the accompanying drawings, is intended to explain exemplary examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
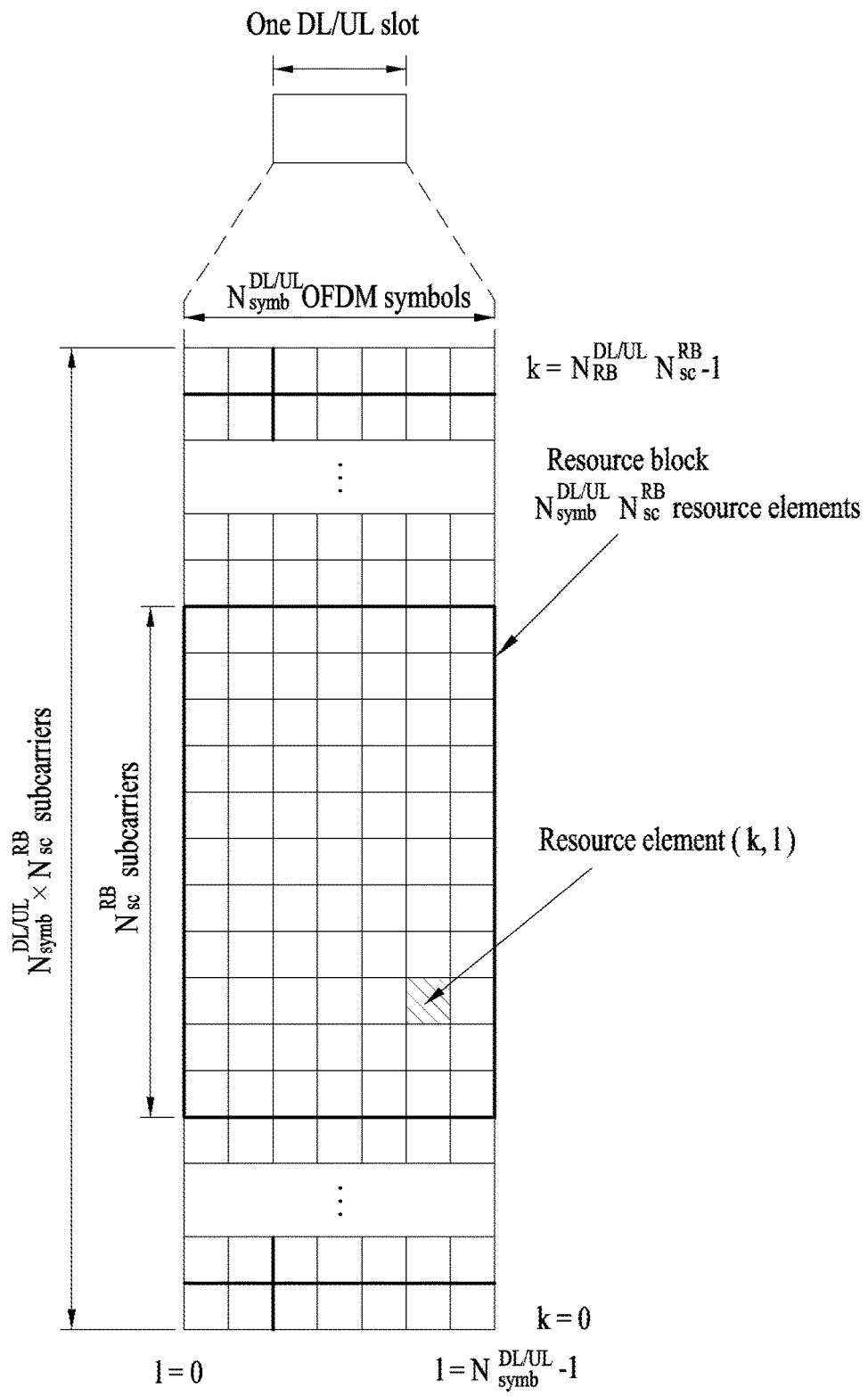
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and may be categorized into an MIB, SIB Type 1 (SIB1), SIB Type 2 (SIB2), and SIB3 to SIB17 according to included parameters.

The MIB includes most frequency transmitted parameters which are essential for initial access of the UE to a network of the eNB. The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

SIB1 includes not only information about time-domain scheduling of other SIBs but also parameters needed to determine whether a specific cell is suitable for cell selection. SIB1 is received by the UE through broadcast signaling or dedicated signaling.

A DL carrier frequency and a system BW corresponding to the DL carrier frequency may be acquired by the MIB that the PBCH carries. A UL carrier frequency and a system BW corresponding to the UL carrier frequency may be acquired through system information which is a DL signal. If no stored valid system information about a corresponding cell is present as a result of receiving the MIB, the UE applies a DL BW in the MIB to a UL BW until SIB2 is received. For example, the UE may recognize an entire UL system BW which is usable for UL transmission thereby through UL-carrier frequency and UL-BW information in SIB2 by acquiring SIB2.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDCCH/PDSCH reception and PUSCH/PUCCH transmission as general uplink/downlink transmission procedures.

The random access procedure is also referred to as a random access channel (RACH) procedure. The random access procedure is used for various purposes including initial access, adjustment of UL synchronization, resource assignment, and handover. Random access procedures are categorized into a contention-based procedure and a dedicated (i.e., non-contention-based) procedure. The contention-based random access procedure is used for general operations including initial access, while the dedicated random access procedure is used for limited operations such as handover. In the contention-based random access procedure, the UE randomly selects a RACH preamble sequence. Accordingly, it is possible for multiple UEs to transmit the same RACH preamble sequence at the same time. Thereby, a contention resolution procedure needs to be subsequently performed. On the other hand, in the dedicated random access procedure, the UE uses an RACH preamble sequence that the eNB uniquely allocates to the UE. Accordingly, the random access procedure may be performed without collision with other UEs.

The contention-based random access procedure includes the following four steps. Messages transmitted in Steps 1 to 4 given below may be referred to as Msg1 to Msg4.

Step 1: RACH preamble (via PRACH) (from UE to eNB)
Step 2: Random access response (RAR) (via PDCCH and PDSCH) (from eNB to UE)
Step 3: Layer 2/layer 3 message (via PUSCH) (from UE to eNB)
Step 4: Contention resolution message (from eNB to UE)

The dedicated random access procedure includes the following three steps. Messages transmitted in Steps 0 to 2 may be referred to as Msg0 to Msg2, respectively. Uplink transmission (i.e., Step 3) corresponding to the RAR may also be performed as a part of the random access procedure. The dedicated random access procedure may be triggered using a PDCCH for ordering transmission of an RACH preamble (hereinafter, a PDCCH order).

Step 0: RACH preamble assignment (from eNB to UE) through dedicated signaling
Step 1: RACH preamble (via PRACH) (from UE to eNB)
Step 2: RAR (via PDCCH and PDSCH) (from eNB to UE)

After transmitting the RACH preamble, the UE attempts to receive an RAR within a preset time window. Specifically, the UE attempts to detect a PDCCH with RA-RNTI (Random Access RNTI) (hereinafter, RA-RNTI PDCCH) (e.g., CRC is masked with RA-RNTI on the PDCCH) in the time window. In detecting the RA-RNTI PDCCH, the UE checks the PDSCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

Figure 3:
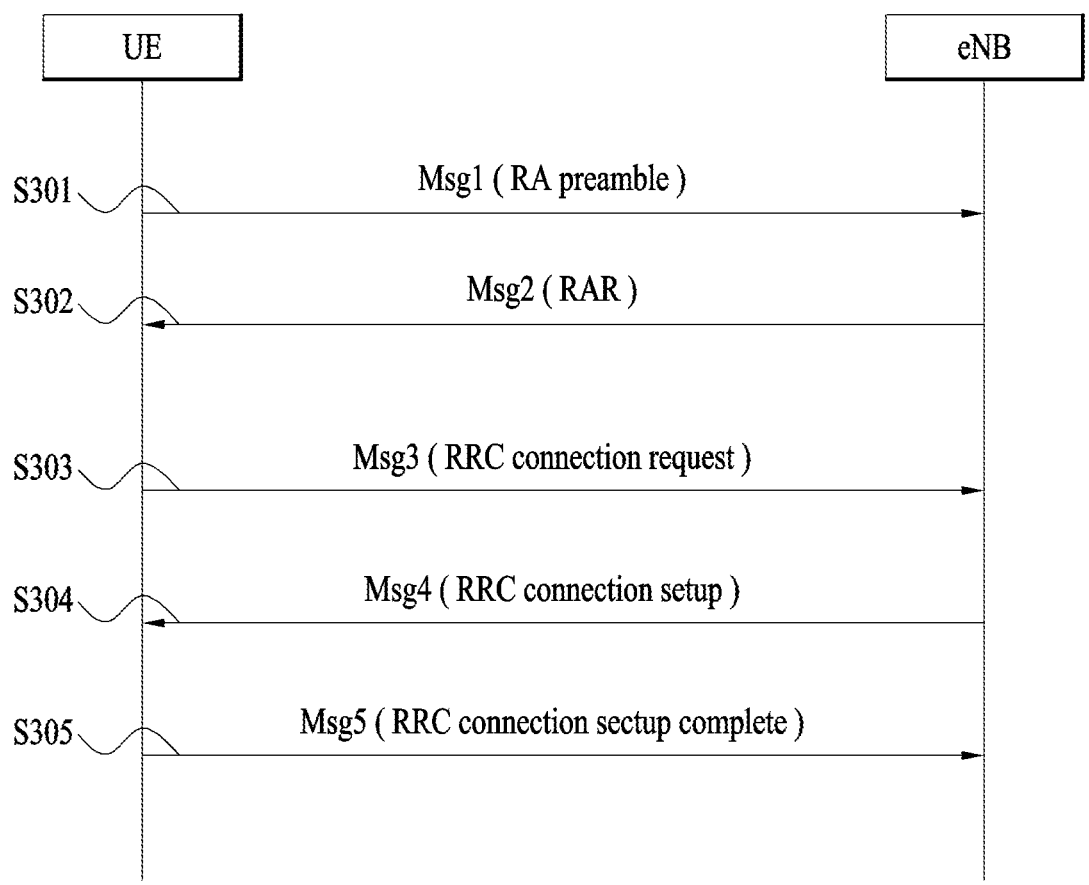
FIG. 3 illustrates a connection procedure in a radio resource control (RRC) layer.

FIG. 3 illustrates a connection procedure in a radio resource control (RRC) layer.

The random access procedure will now be described again with reference to FIG. 3 in terms of an RRC layer. An RRC state differs according to whether RRC connection has been established or not. The RRC state refers to a state indicating whether or not an entity of an RRC layer of the UE has been logically connected with an entity of an RRC layer of the eNB. A state in which the entity of the RRC layer of the UE has been logically connected with the entity of the RRC layer of the eNB is referred to as an RRC connected state and a state having no logical connection therebetween is referred to as an RRC idle state. That is, only the presence or absence of the UE in the idle state is identified in units of a large area and the UE should transition to the connected state in order to receive a normal mobile communication service such as voice or data. When a user initially turns on the UE, the UE first searches for a proper cell and then stays in an idle state in the cell. Only when the UE staying in the idle state needs to establish an RRC connection, the UE establishes the RRC connection with the RRC layer of the eNB through an RRC connection procedure and transitions to the RRC connected state. The RRC connection procedure broadly includes a process in which the UE transmits an RRC connection request message to the eNB, a process in which the eNB transmits an RRC connection setup message to the UE, and a process in which the UE transmits an RRC connection setup complete message to the UE. Since a UL grant is needed to transmit the RRC connection request message, the UE in the idle mode should perform an RACH procedure to acquire the UL grant. That is, the UE should transmit an RA preamble (i.e., Msg1) (S301) and receive an RAR (i.e., Msg2), which is a response to the RA preamble, (S302). The UE transmits Msg3 including the RRC connection request message to the eNB according to resource allocation information (i.e., scheduling information) and a timing advance value in the RAR (S303). Upon receiving the RRC connection request message from the UE, and the eNB accepts the RRC connection request if radio resources are sufficient and transmits an RRC connection setup message, which is a response to the RRC connection request message, to the UE (S304). Upon receiving the RRC connection setup message, the UE transmits an RRC connection setup complete message to the eNB (S305). Only when the UE successfully transmits the RRC connection setup message, the UE establishes RRC connection with the eNB and transitions to the RRC connected mode.

Figure 4:
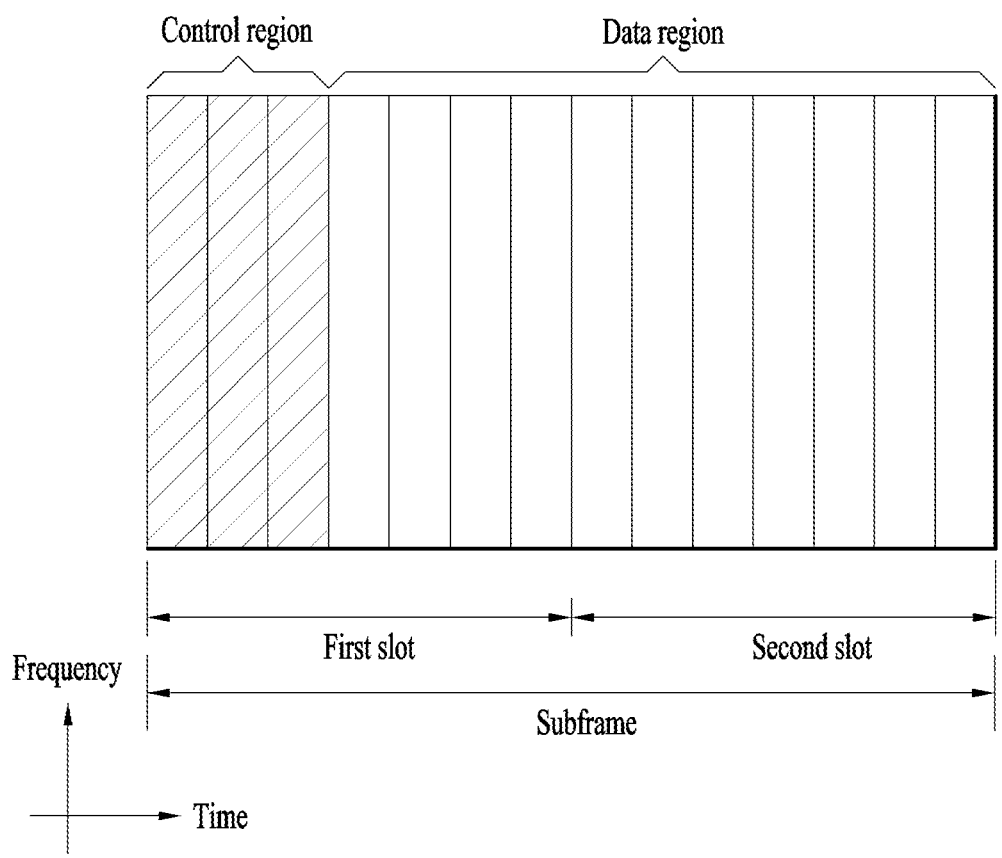
FIG. 4 illustrates the structure of a DL subframe used in the LTE/LTE-A based wireless communication system.

FIG. 4 illustrates the structure of a DL subframe used in the LTE/LTE-A based wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PCFICH and PHICH). Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$. A PDCCH including n consecutive CCEs may be transmitted only on CCEs fulfilling "i mod n=0" wherein i is a CCE number.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. The set of PDCCH candidates that the UE is to monitor is defined in terms of SSs, where a search space $S^{(L)}_k$ at aggregation level $L \in \{1,2,4,8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs. The following table shows an example of the aggregation levels defining the search spaces.

TABLE 1

| Type | Search space $S^{(L)}_k$ | | Number of PDCCH candidates $M^{(L)}$ |
|------|---|---|---|
| | Aggregation level L | Size [in CCEs] | |
| UE-specific | 1 | 6 | 6 |
| | 2 | 12 | 6 |

TABLE 1-continued

| Type | Search space $S^{(L)}_k$ Aggregation level L | Size [in CCEs] | Number of PDCCH candidates $M^{(L)}$ |
|---|---|---|---|
| | 4 | 8 | 2 |
| | 8 | 16 | 2 |
| Common | 4 | 16 | 4 |
| | 8 | 16 | 2 |

The control region of each serving cell consists of a set of CCEs, numbered from 0 to $N_{CCE,k}-1$, where $N_{CCE,k}$ is the total number of CCEs in the control region of subframe k. In the 3GPP LTE/LTE-A system, a set of CCEs at which a PDCCH can be located is defined for each UE. The UE monitors a set of PDCCH candidates on one or more activated serving cells configured as serving cells by higher layer signaling for control information. In this case, monitoring means attempting to decode each of PDCCHs in a set according to all monitored DCI formats. For each serving cell on which PDCCH is monitored, the CCEs corresponding to PDCCH candidates m of the search space $S^{(L)}_k$ are configured by "$L*\{(Y_k+m') \bmod \text{floor}(N_{CCE,k}/L)\}+i$", where $i=0,\ldots,L-1$. For the common search space m'=m. For the PDCCH UE specific search space, for the serving cell on which PDCCH is monitored, if the monitoring UE is configured with carrier indicator field then $m'=m+M^{(L)}*n_{CI}$ where $n_{CI}$ is the carrier indicator field (CIF) value, else if the monitoring UE is not configured with carrier indicator field then m'=m, where $m=0,1,\ldots,M^{(L)}-1$. $M^{(L)}$ is the number of PDCCH candidates to monitor at aggregation level L in the given search space. The carrier indication field value can be the same as a serving cell index (ServCellIndex). For the common search space, $Y_k$ is set to 0 for the two aggregation levels L=4 and L=8. For the UE-specific search space $S^{(L)}_k$ at aggregation level D, the variable $Y_k$ is defined by "$Y_k=(A\cdot Y_{k-1}) \bmod D$", where $Y_{-1}=n_{RNTI}\neq 0$, A=39827, D=65537 and $k=\text{floor}(n_s/2)$. $n_s$ is the slot number within a radio frame.

FIG. 4 illustrates the structure of a UL subframe used in the LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

For PUSCH demodulation, a PUSCH DM-RS may be transmitted in a PUSCH region and, for PUCCH demodulation, a PUCCH DM-RS may be transmitted in a PUCCH region. Meanwhile, a sounding reference signal (SRS) may be allocated to the PUSCH region. The SRS is a UL RS which is not associated with PUSCH or PUCCH transmission. The SRS is transmitted in an OFDM symbol which is located at the last part of a UL subframe in the time domain and in a data transmission band of the UL subframe, that is, in the PUSCH region, in the frequency domain. The eNB may measure a UL channel state between the UE and the eNB using the SRS. SRSs of multiple UEs transmitted/received in the last OFDM symbol of the same subframe may be distinguished according to frequency position/sequence. Since the PUCCH DM-RS, the PUSCH DM-RS, and the SRS are UE-specifically generated by a specific UE and are transmitted to the eNB, these signals may be regarded as UL UE-specific RSs (hereinafter, UL UE-RSs). A UL UE-RS is defined by a cyclic shift α a of a base sequence $r_{u,v}(n)$ according to a predetermined rule. For the PUCCH DM-RS, the PUSCH DM-RS, and the SRS, a plurality of base sequences are defined. For example, the base sequences may be defined using a root Zadoff-Chu sequence. The base sequences $r_{u,v}(n)$ are divided into a plurality of base sequence groups. Each base sequence group includes one or more base sequences. Among the plural base sequences, a base sequence for the UL UE-RS is determined based on a cell identifier, an index of a slot to which the UL UE-RS is mapped, and the like. The cell identifier may be a physical layer cell identifier acquired by the UE from a synchronization signal or a virtual cell identifier provided by a higher layer signal. A cyclic shift value used for cyclic shift of the base sequence is determined based on the cell identifier, a cyclic shift related value given by DCI and/or higher layers, an index of a slot to which the UL UE-RS is mapped, and the like.

Figure 5:
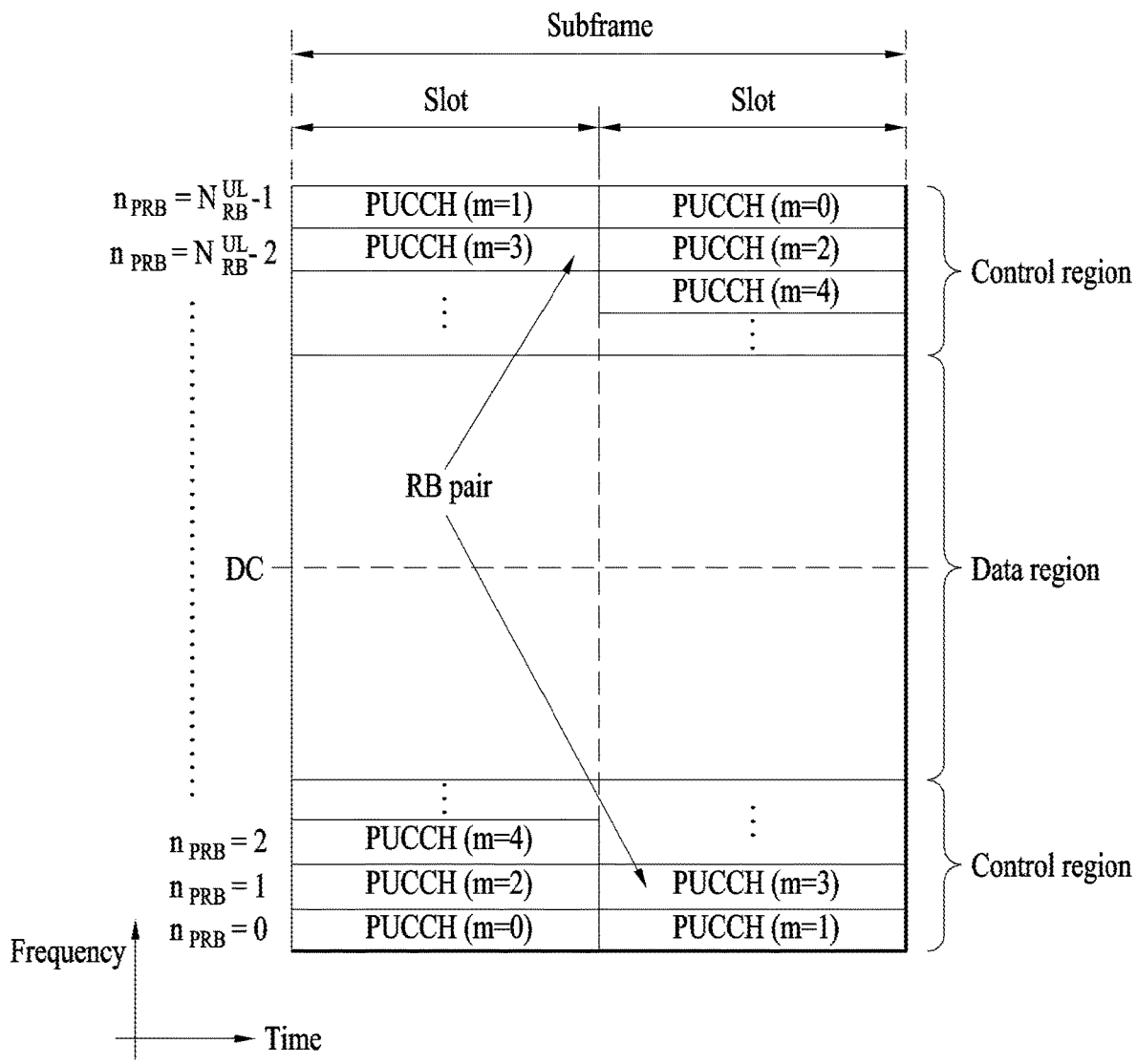
FIG. 5 illustrates the structure of a UL subframe used in the LTE/LTE-A based wireless communication system.
Figure 6:
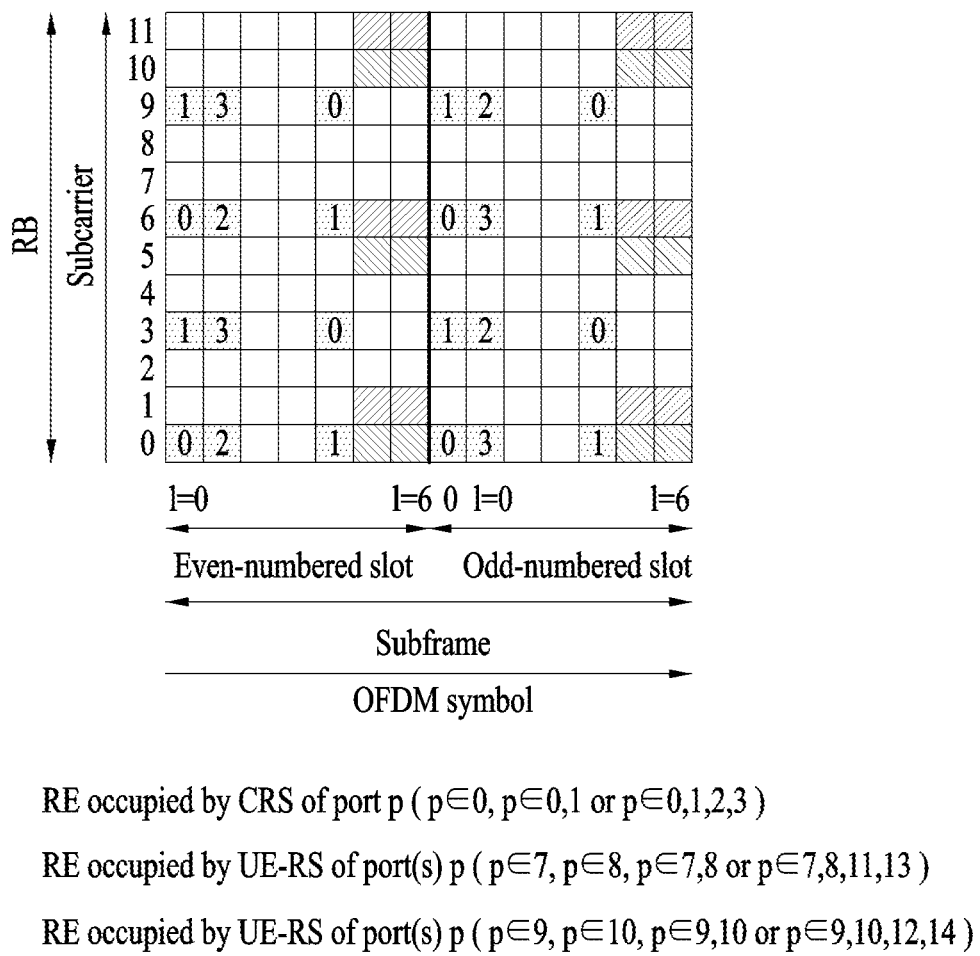
FIG. 6 illustrates a cell-specific reference signal (CRS) and a UE-specific reference signal (UE-RS).

FIG. 6 illustrates CRSs and UE-RSs. In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

Referring to FIG. 6, a CRS is transmitted through antenna port p=0, p=0,1, or p=0,1,2,3 according to the number of antenna ports of a transmission node. The CRS is fixed to a predetermined pattern in a subframe regardless of a control region and a data region. A control channel is allocated to a resource on which the CRS is not allocated in the control region and a data channel is allocated to a resource on which the CRS is not allocated in the data region.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-RS and a CSI-RS are further defined in addition to a CRS. The UE-RS is used for demodulation and the CSI-RS is used to derive CSI. The UE-RS is one type of a DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 6, UE-RSs are transmitted on antenna port(s) p=5, p=7, p=8 or p=7,8, . . . , v+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

In the 3GPP LTE-A system, the UE-RSs are defined in a PRB pair. Referring to FIG. 6, in a PRB having frequency-domain index $n_{PRB}$ assigned for PDSCH transmission with respect to p=7, p=8, or p=7,8, . . . , v+6, a part of UE-RS sequence r(m) is mapped to complex-valued modulation symbols $a_{k,l}^{(p)}$ in a subframe.

Meanwhile, the CSI-RS is a DL RS introduced for channel measurement. The 3GPP LTE-A system defines a plurality of CSI-RS configurations for CSI-RS transmission.

Figure 7:
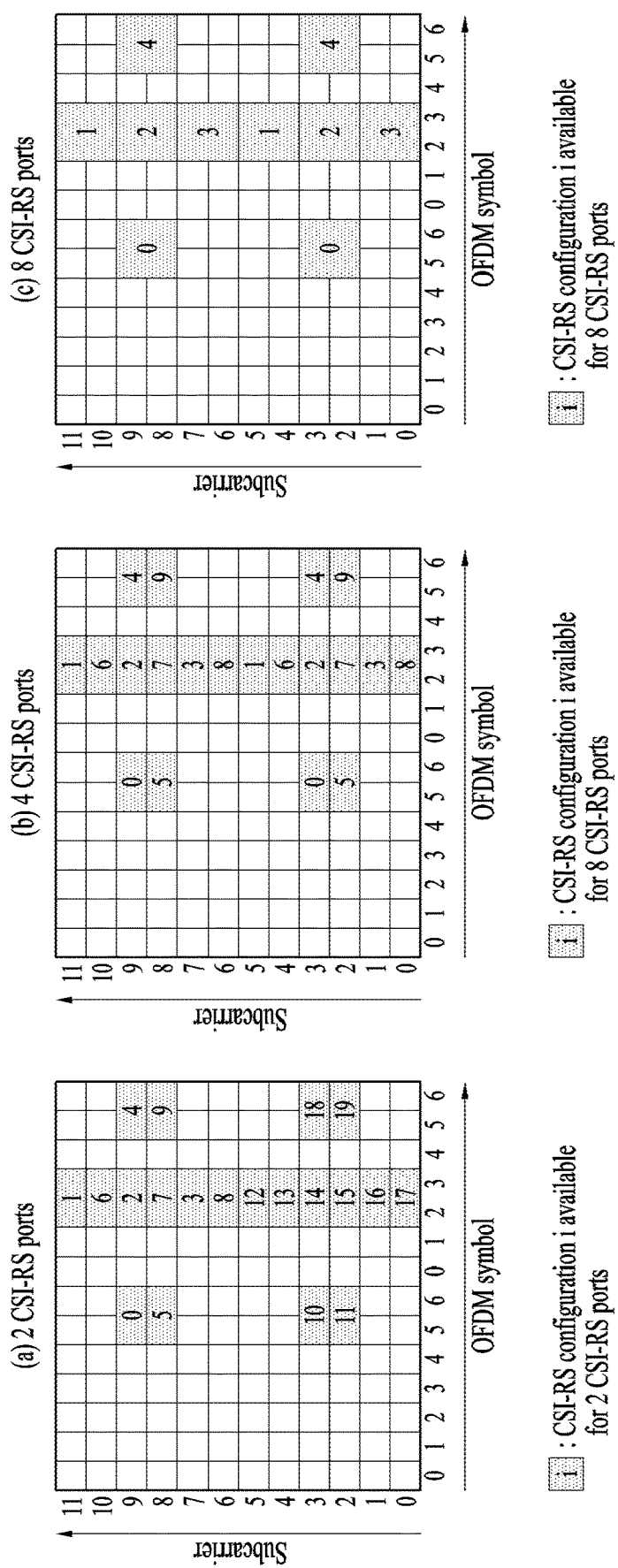
FIG. 7 illustrates channel state information reference signal (CSI-RS) configurations.
Figure 8:
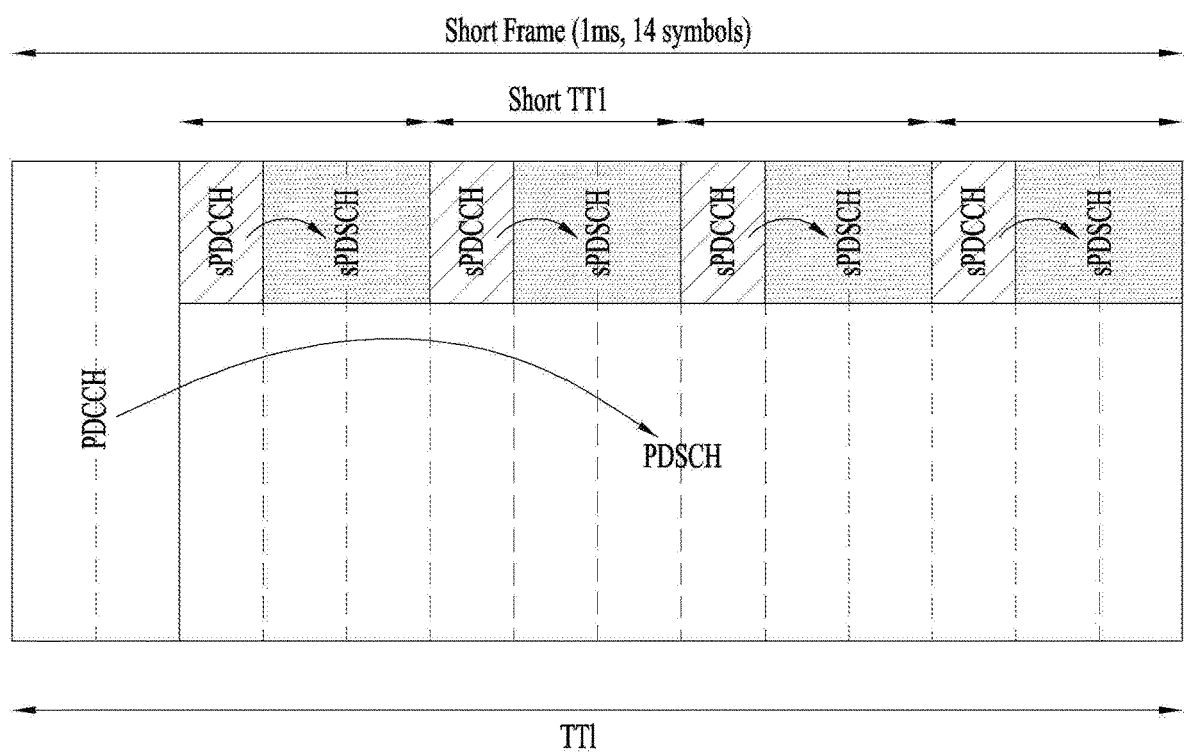
FIG. 8 illustrates an example of a short TTI and a transmission example of a control channel and a data channel in the short TTI.
Figure 9:
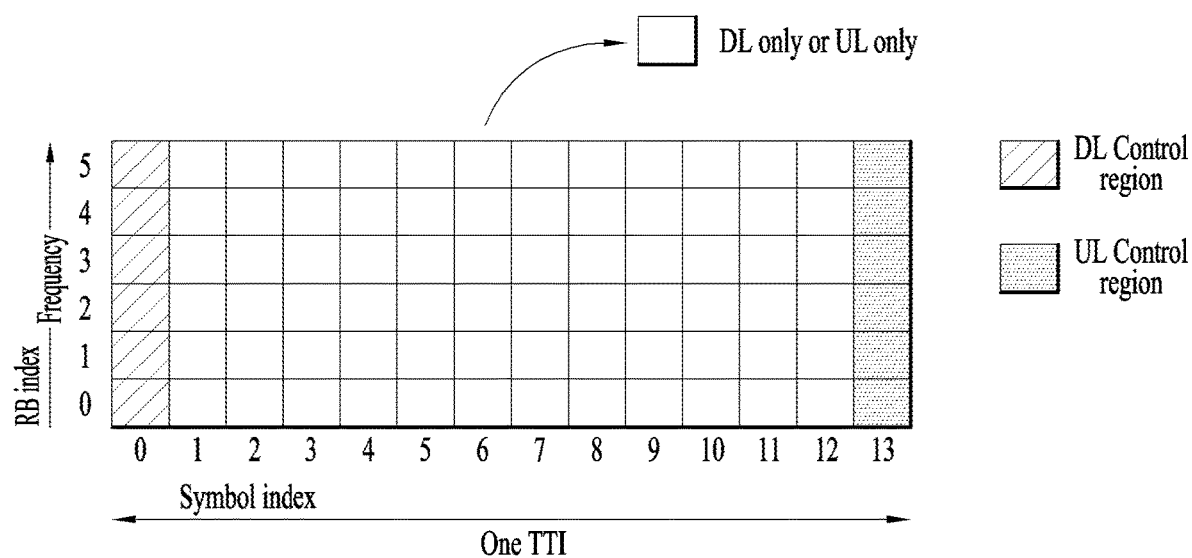
FIG. 9 illustrates a subframe structure.
Figure 10:
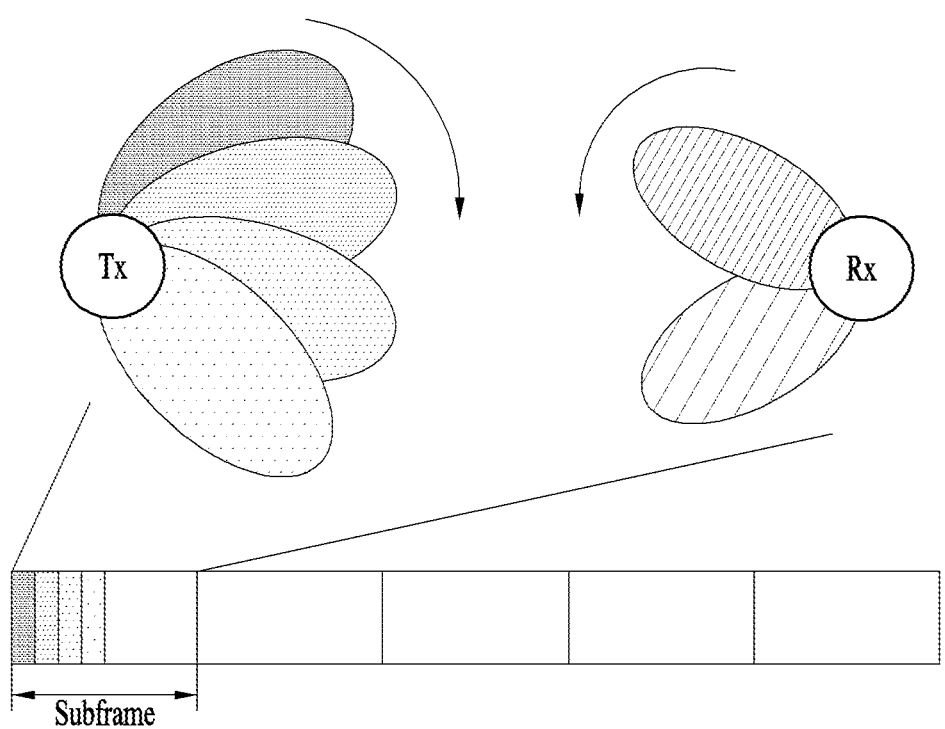
FIG. 10 illustrates an application example of analog beamforming.

FIG. 7 illustrates CSI-RS configurations. Particularly, FIG. 7(a) illustrates 20 CSI-RS configurations 0 to 19 available for CSI-RS transmission through two CSI-RS ports among the CSI-RS configurations, FIG. 7(b) illustrates 10 available CSI-RS configurations 0 to 9 through four CSI-RS ports among the CSI-RS configurations, and FIG. 7(c) illustrates 5 available CSI-RS configurations 0 to 4 through 8 CSI-RS ports among the CSI-RS configurations. The CSI-RS ports refer to antenna ports configured for CSI-RS transmission. For example, referring to Equation 15, antenna ports 15 to 22 correspond to the CSI-RS ports. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair but also with subframes in which CSI-RSs are configured. That is, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations. Hereinafter, in order to distinguish between a CSI-RS configuration to which a CSI-RS configuration number is assigned and a CSI-RS configuration varying according to a CSI-RS configuration number, the number of CSI-RS ports, and/or a CSI-RS configured subframe, the CSI-RS configuration of the latter will be referred to as a CSI-RS resource configuration.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table shows CSI-RS subframe configuration $I_{CSI-RS}$ according to $T_{CSI-RS}$ and $\Delta_{CSI-RS}$.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Subframes satisfying the following equation are subframes including CSI-RSs.

Equation 1

$$(10n_f+\lfloor n_s/2 \rfloor-\Delta_{CSI-RS}) \bmod T_{CSI-RS}=0$$

$P_c$ is the ratio of PDSCH EPRE to CSI-RS EPRE, assumed by the UE when the UE derives CSI for CSI feedback. EPRE indicates energy per RE. CSI-RS EPRE indicates energy per RE occupied by the CSI-RS and PDSCH EPRE denotes energy per RE occupied by a PDSCH.

The zero-power CSI-RS configuration list denotes CSI-RS pattern(s) in which the UE should assume zero transmission power. For example, since the eNB will transmit signals at zero transmission power on REs included in CSI-RS configurations indicated as zero transmission power in the zero power CSI-RS configuration list, the UE may assume signals received on the corresponding REs as interference or decode DL signals except for the signals received on the corresponding REs. The zero power CSI-RS configuration list may be a 16-bit bitmap corresponding one by one to 16 CSI-RS patterns for four antenna ports. In the 16-bit bitmap, the most significant bit corresponding to a CSI-RS configuration of the lowest CSI-RS configuration number (also called a CSI-RS configuration index) and subsequent bits correspond to CSI-RS patterns in an ascending order. The UE assumes zero transmission power with respect to REs of a CSI-RS pattern corresponding to bit(s) set to '1' in the 16-bit zero power CSI-RS bitmap configured by a higher layer. Hereinafter, a CSI-RS pattern in which the UE assumes zero transmission power will be referred to as a zero power CSI-RS pattern.

A zero power CSI-RS subframe configuration is information for specifying subframes including the zero power CSI-RS pattern. Like the CSI-RS subframe configuration, a subframe in which the zero power CSI-RS occurs may be configured for the UE using $I_{CSI-RS}$ according to Table 10. The UE may assume that subframes satisfying Equation 1 include the zero power CSI-RS pattern. $I_{CSI-RS}$ may be separately configured with respect to a CSI-RA pattern in which the UE should assume non-zero transmission power and a zero power CSI-RS pattern in which the UE should assume zero transmission power, on REs.

The UE configured for a transmission mode (e.g. transmission mode 9 or other newly defined transmission modes) according to the 3GPP LTE-A system may perform channel measurement using a CSI-RS and demodulate or decode a PDSCH using a UE-RS.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107,108,109,110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE monitors a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

For distributed transmission, each resource element in an EREG is associated with one out of two antenna ports in an alternating manner where $p \in \{107,109\}$ for normal cyclic prefix and $p \in \{107,108\}$ for extended cyclic prefix.

Hereinbelow, the PDCCH and the EPDCCH are collectively referred to as the PDCCH or the (E)PDCCH.

Recently, applying the CoMP technology to the LTE/LTE-A system has been considered. Coordinated multi-point (CoMP) technology involves a plurality of nodes. If the CoMP technology is introduced to the LTE/LTE-A system, a new transmission mode may be defined in association with the CoMP technology. There may be various CSI-RS configurations received by a UE according to a scheme in which the nodes participate in communication. Due to this, a maximum of one CSI-RS configuration or one CSI-RS resource configuration in which the UE should assume non-zero transmission power for a CSI-RS can be used in the legacy LTE system, whereas a maximum number of CSI resource configurations available for a CoMP configured UE, i.e., a UE configured in a CoMP mode is more than one. When the UE is configured in a mode where the UE can be configured with one or more CSI-RS resource configurations, that is, when the UE is configured in a CoMP mode, the UE may receive a higher-layer signal including information about one or more CSI-RS resource configurations. If carrier aggregation (hereinafter, CA) as well as CoMP is configured for the UE, one or more CSI-RS resource configurations per serving cell can be used. In the legacy LTE/LTE-A system, the UE has transmitted/received signals to/from one node in a specific serving cell. In more detail, in the legacy LTE/LTE-A system, since only one radio link is present in one serving cell, only one CSI could be calculated by the UE with respect to one serving cell. In contrast, in CoMP involving a plurality of nodes, DL channel states may differ per node or per combination of nodes. Since CSI-RS resource configurations may differ according to a node or combination of nodes, CSI is associated with a CSI-RS resource. In addition, channel states may vary with an interference environment between nodes participating in CoMP. In other words, if CoMP is configured, a channel state per node or per combination of nodes may be measured by the UE and, since CSI may be present in each interference environment, a maximum number of CSIs which can be calculated per serving cell of the UE may be an integer greater than one. Which CSI the UE should report and how the UE should report the CSI in order for the UE to derive the CSI may be configured by higher layers. If CoMP is configured, a plurality of CSIs as well as one CSI can be calculated by the UE. Accordingly, when the UE is configured as the CoMP mode, a CSI report for one or more CSIs per serving cell of the UE may be configured for a periodic or aperiodic CSI report.

The CSI report is periodically or aperiodically configured. The periodic CSI report is transmitted by the UE on a PUCCH except for a special case (e.g., when the UE is not configured for simultaneous PUSCH and PUCCH transmission and when a PUCCH transmission timing collides with a subframe with PUSCH allocation). The aperiodic CSI report is triggered by a CSI request field included in the DCI (e.g. DCI of DCI format 0 or 4) for scheduling of UL data (hereinafter, UL DCI format). The UE, which has decoded the UL DCI format or a random access response grant for a specific serving cell (hereinafter, serving cell c) in subframe n, performs the aperiodic CSI report using a PUSCH in subframe n+k in the serving cell c, when the CSI request field is set to trigger the CSI report and when the CSI request field is not reserved. The PUSCH is a PUSCH transmitted in subframe n+k according to the UL DCI format decoded in subframe n. In the case of FDD, k=4. In the case of TDD, k is given by the following table.

TABLE 3

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | | 7 | 7 | | | | 7 | 7 | | 5 |

Meanwhile, as mentioned above, in CoMP, the CSI is associated with a CSI-RS resource used for channel measurement and a resource used for interference measurement (hereinafter, an interference measurement (IM) resource). Hereinafter, the association between one CSI-RS resource for signal measurement and one IM resource for IM will be referred to as a CSI process. That is, the CSI process may be associated with one CSI-RS resource and one IM resource (IMR). It is desirable that an eNB to which a UE is connected or an eNB for managing a node of a cell in which the UE is located (hereinafter, a serving eNB) transmit no signals on an IMR. Accordingly, the IMR may be configured for the UE by the same scheme as in a zero-power CSI-RS. For example, the eNB may inform the UE of REs used by the UE for IM, using the 16-bit bitmap indicating the above-described zero power CSI-RS pattern and using the CSI-RS subframe configuration. In this way, if the IMR is explicitly configured for the UE, the UE measures interference on the IMR and calculates CSI under the assumption that the measured interference is interference on a CSI reference resource which is a criterion for CSI measurement. More specifically, the UE may perform channel measurement based on a CSI-RS or a CRS, perform interference measurement based on the IMR, and acquire the CSI based on the channel measurement and the interference measurement. Accordingly, one CSI reported by the UE may correspond to one CSI process. Each CSI process may have an independent CSI feedback configuration. The independent feedback configuration refers to a feedback mode, a feedback period, a feedback offset, etc. The feedback offset corresponds to a start subframe with feedback among subframes in a radio frame. The feedback mode may be differently defined according to whether CQI included in feedback CSI among an RI, CQI, a PMI, and a TPMI is CQI for a wideband, CQI for a subband or CQI for a subband selected by the UE, whether the CSI includes the PMI, and whether the CSI includes a single PMI or a plurality of PMIs.

In a legacy system based on communication with one node, since a UE-RS, a CSI-RS, and a CRS are transmitted at the same location, the UE does not consider that delay spread, Doppler spread, frequency shift, average received power, and reception timing of a UE-RS port, a CSI-RS port, and a CRS port may differ. However, in a communication system to which CoMP communication technology in which more than one node can simultaneously participate in communication with the UE is applied, properties of the PDCCH port, the PDSCH port, the UE-RS port, the CSI-RS port, and/or the CRS port may be different. For this reason, the concept of a quasi co-located antenna port is introduced for a mode in which a plurality of nodes has the probability of participating in communication (hereinafter, a CoMP mode). The terms "quasi co-located (QCL)" or "quasi co-location (QCL)" may be defined as follows in terms of an antenna port: If two antenna ports are quasi co-located, the UE may assume that large-scale properties of a signal received from one of the two antenna ports can be inferred from a signal received from the other antenna port. The large-scale properties include delay spread, Doppler spread, frequency shift, average received power, and/or reception timing. QCL may be defined as follows in terms of a channel. If two antenna ports are quasi co-located, the UE may assume that large-scale properties of a channel over which a symbol on one of the two antenna ports is conveyed can be inferred from large-scale properties of a channel over which a symbol on the other antenna port is conveyed. The large-scale properties include delay spread, Doppler spread, Doppler shift, average gain, and/or average delay. In embodiments of the present invention, QCL may conform to one of the above definitions. Alternatively, in another similar way, the definition of QCL may be modified such that it may be assumed that antenna ports satisfying QCL assumption are co-located. For example, the concept of QCL may be defined such that the UE may assume that antenna ports satisfying QCL assumption are antenna ports of the same transmission point. The UE cannot assume that the same large-scale properties are satisfied between non-quasi-co-located (NQC) antenna ports. In this case, a normal UE needs to perform independent processing for each configured NQC antenna regarding timing acquisition and tracking, frequency offset estimation and compensation, delay estimation, and Doppler estimation. On the other hand, for antenna ports which can be assumed to be QCL, the UE can advantageously perform the following operations:

Regarding Doppler spread, the UE may identically apply estimation results of power-delay-profile, delay spread, Doppler spectrum, and Doppler spread for any one port to a filter (e.g., a Wiener filter) which is used to perform channel estimation for another port;

Regarding frequency shift and received timing, after performing time and frequency synchronization for any one port, the UE may apply the same synchronization to demodulation of another port;

Regarding average received power, the UE may average measurements of reference signal received power (RSRP) over two or more antenna ports.

For example, upon receiving specific DMRS-based DL-related DCI format (e.g., DCI 2C) through a PDCCH/EPDCCH, the UE performs channel estimation of a corresponding PDSCH through a configured DMRS sequence and then performs data demodulation. If the UE can assume that a DMRS port configuration received from a DL scheduling grant is QCL with a port for a specific RS (e.g., a specific CSI-RS, a specific CRS, or a DL serving-cell CRS), then the UE may apply the estimate(s) of the large-scale properties estimated through the port for the specific RS during channel estimation through a corresponding DMRS port, thereby improving receiver processing performance.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

FIG. 5 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2

OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to examples described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 5, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

In a new RAT (NR) system, a time unit in which a data channel may be scheduled may be referred to as other terms, for example, a slot, instead of a subframe. The number of slots in a radio frame of the same time length may differ according to a time length of a slot. In the present invention, the terms "subframe", "TTI", and "slot" are interchangeably used to indicate a basic time unit of scheduling.

OFDM Numerology

The new RAT system uses an OFDM transmission scheme or a similar transmission scheme. For example, the new RAT system may follow the OFDM parameters defined in the following table. Or although the new RAT system still uses the legacy LTE/LTE-A numerology, the new RAT system may have a wider system bandwidth (e.g., 100 MHz). Or one cell may support a plurality of numerologies. That is, UEs operating with different numerologies may co-exist within one cell.

Analog Beamforming

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

Subframe Structure

FIG. 6 illustrates a new RAT (NR) subframe structure.

To minimize a data transmission delay, a subframe structure in which a control channel and a data channel are multiplexed in time division multiplexing (TDM) is considered in 5G new RAT.

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

In a legacy LTE/LTE-A system, a DL control channel is TDMed with a data channel (refer to FIG. 3) and a PDCCH, which is a control channel, is transmitted throughout an entire system band. However, in new RAT, it is expected that a bandwidth of one system reaches approximately a minimum of 100 MHz. Therefore, it is difficult to distribute the control channel throughout the entire band for transmission of the control channel. For data transmission/reception of the UE, if the entire band is monitored to receive the DL control channel, this may cause increase in battery consumption of the UE and deterioration of efficiency. Accordingly, the present invention proposes a scheme in which the DL control channel can be locally transmitted or distributively transmitted in a partial frequency band in a system band, i.e., a channel band.

FIG. 7 illustrates a transmission/reception method of a radio signal using an analog beam. Particularly, FIG. 7 illustrates a transmission/reception method of a radio signal by transmission/reception analog beam scanning.

Referring to FIG. 7, if an eNB transmits a synchronization signal in a cell or a carrier while switching beams, a UE performs synchronization with the cell/carrier using the synchronization signal detected in the cell/carrier and discovers a most suitable (beam) direction for the UE. The UE should be capable of acquiring a cell ID and a beam ID (corresponding to the beam direction) by performing this procedure. The UE may acquire signals, particularly, RS information, transmitted in the beam direction, for example, an RS sequence, seed information, and location, while acquiring the beam ID. The eNB may allocate a group ID to UEs that have acquired a specific beam ID, i.e., UEs capable of receiving a DL channel in a specific beam direction. Cell-common information may be temporally/spatially divided on a beam ID basis and then transmitted to the UE. The cell-common information may be transmitted to the UE by a beam ID common scheme.

Upon acquiring the beam ID in a cell, the UE may receive cell-specific information as beam ID or group ID specific information. The beam ID or group ID specific information may be information that UEs of a corresponding group commonly receive.

In a multi-beam environment, repetition of a PRACH preamble or beam sweeping may be considered according to a transmission (Tx)/reception (Rx) reciprocal capability of a transmission and reception point (TRP) (e.g., gNB) or the UE. The Tx/Rx reciprocal capability is also referred to as Tx/Rx beam correspondence in the TRP and the UE. In the multi-beam environment, if the Tx/Rx reciprocal capability in the TRP or the UE does not hold, the UE may not transmit a UL signal in a beam direction in which the UE has received a DL signal because an optimal path of UL may be different from an optimal path of DL. Tx/Rx beam correspondence in the TRP holds, if the TRP can determine a TRP Rx beam for UL reception based on DL measurement of the UE for one or more Tx beams of the TRP and/or if the TRP can determine a TRP Tx beam for DL transmission based on UL measurement for one or more Rx beams of the TRP. Tx/Rx beam correspondence in the UE holds, if the UE can determine a UE Rx beam for UL transmission based on DL measurement of the UE for one or more Rx beams of the UE and/or if the UE can determine a UE Tx beam for DL reception according to indication of the TRP based on UL measurement for one or more Tx beams of the UE.

In the LTE/LTE-A system, a PSS/SSS is transmitted omnidirectionally, whereas, a method is considered in which the eNB to which millimeter wave (mmWave) is applied transmits a signal such as a PSS/SSS/PBCH through beamforming while changing beam directions omnidirectionally. In this way, transmission/reception of a signal while changing beam directions is referred to as beam sweeping or beam scanning. For example, assuming that the eNB may have a maximum of N beam directions, the eNB transmits a signal such as a PSS/SSS/PBCH in each of the N beam directions. That is, the eNB transmits a synchronization signal such as the PSS/SSS/PBCH in each direction while sweeping directions that the eNB can have or the eNB desires to support. Alternatively, when the eNB can form N beams, one beam group may be configured by grouping a few beams and the PSS/SSS/PBCH may be transmitted/received in each beam group direction. In this case, one beam group includes one or more beams. A bundle of the PSS/SSS/PBCH per beam group is referred to as an SS block. In terms of synchronization signal transmission, the "SS block" is defined as a container for carrying the PSS, the SSS, the PBCH, and/or other system information. That is, the SS block is made by a combination of synchronization signals.

In the legacy LTE system, a control channel have been categorized into a control channel indicating transmission of system information, which is cell common, and a control channel indicating transmission of a UE-dedicated data channel, which is UE-specific. The control channel indicating transmission of the system information and the control channel indicating transmission of the UE-dedicated data channel are separated by different search spaces in the time/frequency domain. That is, a search space is categorized into a common search space (CSS) and a UE-specific search space (USS). The UE should have to perform blind detection (BD) with respect to the CSS and the USS in one subframe. In the CSS, a control channel for system information, a control channel for paging, a control channel for a random access response (RAR), and a control channel for a transmission power control (TPC) command are transmitted. Theses control channels are CRC-masked with a system information radio network temporary identifier (SI-RNTI), a paging RNTI (P-RNTI), a random access RNTI (RA-RNTI), and a TPC RNTI, respectively. The control channel for the UE-specific data channel is CRC-masked with a cell RNTI (C-RNTI) of the UE and then transmitted.

In the legacy LTE system, a common reference signal (CRS) may be present, and the UE may acquire cell ID information in an initial access procedure using a PSS/SSS and acquire basic system information such as CRS port information through a PBCH. In addition, the UE may perform channel estimation for a control channel using the CRS without additional information and decode the control channel. A legacy PDCCH is spread over an entire band and then is transmitted using a cell ID based CRS, whereas an EPDCCH introduced in the LTE-A system may be transmitted in a specific RB. The EPDCCH is advantageous in that DMRS based beamforming can be performed and a CoMP operation can be supported by introducing a virtual cell ID.

The present invention proposes a DL control channel design method in new RAT. Since the CRS is always present regardless of whether or not there is data, there are disadvantages in that CRS overhead increases and an eNB should always be turned on for CRS transmission and in that interference caused by the CRS has a significant effect on a small cell. In NR, free switching between UL and DL is considered. The presence of the CRS makes it difficult to freely switch between UL and DL. Accordingly, in NR, it is expected that the CRS will not be used. In the NR system to be newly introduced, it cannot always be assumed that a broadband RS, which is a cell-common RS, will be transmitted, unlike the legacy LTE system. In the NR system, it may be assumed that an RS of a control channel to be transmitted and control information is equally beamformed. In the LTE system, the UE assumes that the CRS is a default. NR cannot guarantee that the CRS will be necessarily present in a subframe. Hence, the present invention proposes a method in which the UE generates/configures a control channel RS and an RS sequence in a situation in which an RS (or CRS) which can be assumed to be a default is not present, and a method of configuring a search space of the UE according to the generation and configuration method. Prior to a description of the present invention, a method of generating a CRS sequence and a method of generating an EPDCCH sequence, according to the legacy LTE system, will be described. In addition, a method of scrambling a PDCCH/EPDCCH/PDSCH according to the legacy 3GPP LTE system will be described.

An RS sequence $r_{l,n_s}(m)$ of the CRS in the LTE system is defined by the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

Equation 2

Herein, $n_s$ is a slot number within a radio frame and l is an OFDM symbol number within a slot. $N^{max,DL}_{RB}$ denotes the largest DL bandwidth configuration, represented as an integer multiple of $N^{RB}_{sc}$. $c(i)$ denotes a pseudo-random sequence, defined by a length-31 Gold sequence. An output sequence $c(n)$ (where $n=0,1, \ldots, M_{PN}-1$) having a length of $M_{PN}$ is defined by the following equation.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

Equation 3 where $N_C=1600$ and the first m-sequence is initialized with $x_1(0)=1$, $x_1(n)=0$, $n=1,2,\ldots,30$. The initialization of the second m-sequence is denoted by $c_{init}=\sum_{i=0}^{30} x_2(i) \cdot 2^i$ with the value depending on the application of the sequence. In Equation 2, a pseudo-random sequence generator for generating c(i) is initialized with $c_{init}=2^{10}*(7*(n_s+1)+l+1)*(2*N^{cell}_{ID}+1)+2*N^{cell}_{ID}+N_{CP}$ at the start of each OFDM symbol. $N_{CP}$ is 1 for a normal CP and 0 for an extended CP.

An RS sequence r(m) of a UE-specific RS (UE-RS) associated with a PDSCH in the LTE system is defined by the following equation with respect to antenna port 5.

$$r_{n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 12N_{RB}^{PDSCH} - 1$$

Equation 4

Herein, $N^{PDSCH}_{RB}$ denotes a bandwidth assigned as RBs of corresponding PDSCH transmission. The pseudo-random sequence c(i) is defined by Equation 3. A pseudo-random sequence generator is initialized with $c_{init}=(\lfloor n_s/2 \rfloor+1) \cdot (2N^{cell}_{ID}+1) \cdot 2^{16}+n_{RNTI}$ at the start of each subframe and $n_{RNTI}$ is an RNTI associated with a corresponding PDSCH. For example, each of an SI-RNTI for a PDSCH carrying SI, a P-RNTI for a PDSCH carrying a paging message, an RA-RNTI for a PDSCH carrying an RAR, a C-RNTI for a PDSCH carrying UE-dedicated data, and an SPS C-RNTI for a PDSCH using a DL SPS resource corresponds to $n_{RNTI}$.

An RS sequence r(m) of a UE-RS associated with a PDSCH in the LTE system is defined as follows with respect to antenna port $p \in \{7,8, \ldots, v+6\}$.

$$r(m) = \frac{1}{\sqrt{2}}(1 - 2 \cdot c(2m)) + j\frac{1}{\sqrt{2}}(1 - 2 \cdot c(2m+1)),$$

Equation 5

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

Herein, $N^{max,DL}_{RB}$ denotes the largest DL bandwidth configuration, represented as an integer multiple of $N^{RB}_{sc}$. The pseudo-random sequence c(i) is defined by Equation 3. A pseudo-random sequence generator is initialized with $c_{init}=(\lfloor n_s/2 \rfloor+1) \cdot (2n_{ID}^{(n_{SCID})}+1) \cdot 2^{16}+n_{SCID}$ at the start of each subframe. Quantities $n^{(i)}_{ID}$ (where i=0, 1) corresponding to $n^{(nSCID)}_{ID}$ are given by a physical layer cell identifier $N^{cell}_{ID}$ if no value for a scrambling identifier $n^D$ is provided by higher layers for UE-RS generation or if DCI format 1A, 2B, or 2C is used for DCI associated with PDSCH transmission, and are given by $n^{DMRS,i}_{ID}$ otherwise. The value of $n_{SCID}$ is 0 unless specified otherwise. For PDSCH transmission on antenna port 7 or 8, $n_{SCID}$ is given by DCI format 2B or 2C associated with PDSCH transmission. In the case of DCI format 2B, $n_{SCID}$ is indicated by a scrambling identity field according to Table 4. In the case of DCI format 2C or 2D, $n_{SCID}$ is given by Table 5.

TABLE 4

| Scrambling identity field in DCI format 2B | $n_{SCID}$ |
|---|---|
| 0 | 0 |
| 1 | 1 |

TABLE 5

| One Codeword: Codeword 0 enabled, Codeword 1 disabled | | Two Codewords: Codeword 0 enabled, Codeword 0 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

An RS sequence r(m) of a demodulation reference signal (DMRS) associated with an EPDCCH in the LTE system is defined by the following equation with respect to antenna ports $p \in \{107,108,109,110\}$.

$$r(m) = \frac{1}{\sqrt{2}}(1 - 2 \cdot c(2m)) + j\frac{1}{\sqrt{2}}(1 - 2 \cdot c(2m+1)),$$

Equation 6

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

The pseudo-random sequence c(n) is defined by Equation 3 and a corresponding pseudo-random sequence generator is initialized with the following equation at the start of each subframe. $N^{max,DL}_{RB}$ denotes the largest DL bandwidth configuration, represented as an integer multiple of $N^{RB}_{sc}$.

$$c_{init}=(\lfloor n_s/2 \rfloor+1) \cdot (2n_{ID,i}^{EPDCCH}+1) \cdot 2^{16}+n_{SCID}^{EPDCCH}$$

Equation 7

Herein, $n^{EPDCCH}_{SCID}=2$ and $n^{EPDCCH}_{ID,i}$ is configured by higher layers. An EPDCCH set to which an EPDCCH associated with the DMRS belongs is represented by $i \in \{0, 1\}$.

For each codeword q transmitted on a DL physical channel in the LTE system, a block of bits $b^{(q)}(0), \ldots, b^{(q)}(M^{(q)}_{bit}-1)$ is scrambled prior to modulation according to $\tilde{b}^{(q)}(i)+(b^{(q)}(i)+c^{(q)}(i))\mod 2$, resulting in a block of scrambled bits $\tilde{b}^{(q)}(0), \ldots, \tilde{b}^{(q)}(M_{bit}^{(q)}-1)$. The scrambling sequence $c^{(q)}(i)$ is given by Equation 3. A scrambling sequence generator is initialized at the start of each subframe and an initialization value of $c_{init}$ is given by the following equation depending on a transport channel type.

$$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases} \quad \text{Equation 8}$$

Herein, $n_{RNTI}$ corresponds to an RNTI associated with a PDSCH. There are up to two codewords that can be transmitted in one subframe. That is, $q \in \{0,1\}$. In the case of single codeword transmission, q is equal to zero.

In the LTE system, a block of bits $b^{(i)}(0), \ldots, b^{(i)}(M^{(i)}_{bit}-1)$ is multiplexed on each of PDCCHs to be transmitted in a subframe, resulting in a block of bits $b^{(0)}(0), \ldots, b^{(0)}(M^{(0)}_{bit}-1), b^{(1)}(0), \ldots, b^{(1)}(M^{(1)}_{bit}-1), \ldots, b^{(nPDCCH-1)}(0), \ldots, b^{(nPDCCH-1)}(M^{(nPDCCH-1)}_{bit}-1)$. Herein, $n_{PDCCH}$ is the number of PDCCHs transmitted in the subframe and $M^{(i)}_{bit}$ is the number of bits in one subframe to be transmitted on PDCCH number i. The block of the bits $b^{(0)}(0), \ldots, b^{(0)}(M^{(0)}_{bit}-1), b^{(1)}(0), \ldots, b^{(1)}(M^{(1)}_{bit}-1), \ldots, b^{(nPDCCH-1)}(0), \ldots, b^{(nPDCCH-1)}(M^{nPDCCH-1}_{bit}-1)$ is scrambled with a cell-specific sequence prior to modulation according to $\tilde{b}(i)=(b(i)+c(i))\mod 2$, resulting in a block of scrambled bits $\tilde{b}(0), \ldots \tilde{b}(M_{tot}-1)$. The scrambling sequence is given by Equation 3. A scrambling sequence generator is initialized with $c_{init}=\lfloor n_s/2 \rfloor 2^9+N_{ID}^{cell}$ at the start of each subframe. A CCE number n corresponds to bits $b(72n), b(72n+1), \ldots, b(72n+71)$. If necessary, <NIL> elements are inserted in a block of the bits prior to scrambling to ensure that the PDCCHs start at CCE positions and that the length $M_{tot}=8N_{REG} \geq \Sigma_{i=0}^{nPDCCH-1} M_{bit}^{(i)}$ of the block of the scrambled bits matches the amount of REGs not assigned to a PCFICH or a PCFICH.

In the LTE system, a block of bits $b(0), \ldots, b(M_{bit}-1)$ to be transmitted on an EPDCCH in a subframe is scrambled, resulting in a block of the scrambled bits $\tilde{b}(0), \ldots, \tilde{b}(M_{bit}-1)$ according to $\tilde{b}(i)=(B(i)+c(i))\mod 2$. The UE-specific scrambling sequence c(i) is given by Equation 3. A scrambling sequence generator is initialized with $c_{init}=\lfloor n_s/2 \rfloor \cdot 2^9 + n_{ID,m}^{EPDCCH}$, where m is an EPDCCH set number.

The CRS, the UE-RS, and the DMRS are sequences based on a Gold sequence. An initial seed value of the CRS is determined based on a function of a cell ID and an initial seed value of the DMRS is determined based on a function of a virtual cell ID. Since the CRS is transmitted in every subframe in the legacy LTE system, it is desirable to introduce an DMRS based RS for a control channel in NR, similar to the EPDCCH. The reason why initialization caused by the virtual cell ID is supported for the DMRS for the control channel is to support a CoMP operation even for the control channel. The virtual cell ID is transmitted to a UE though higher-layer signaling. The value of the virtual cell ID used by a specific UE should be transmitted through higher-layer signaling and a plurality of virtual cell IDs may be configured. In order for the UE to receive control information until the virtual cell ID is assigned to the UE, it is desirable that a default ID be designated. In addition, in order for the UE to receive the control channel until a search space of the UE is assigned, a default search space in which BD should be performed is needed.

In the NR system, a default operation of the UE before the UE receives configurations of the search space and the virtual cell ID for receiving the control channel may be as follows.

A. A seed value of a control DMRS sequence (i.e., a DMRS sequence for the control channel) may be configured based on a cell ID obtained by the UE in an initial access procedure through detection of a synchronization signal such as a PSS/SSS. Alternatively, until the UE receives additional information about the seed value of the DMRS sequence, the UE may assume that the seed value of the DMRS sequence is determined using an ID value which is implicitly obtained by a UE ID (e.g., C-RNTI) thereof or using the UE ID thereof. In other words, the seed value of the control DMRS sequence may be determined by the following options.

Option A-1) Cell ID or value derived by a function of the cell ID: Option A-1 is the simplest and definite method in determining the seed value of the DMRS sequence. Since the UE uses a cell ID detected thereby to receive a DL control channel, the UE may perform channel estimation for the DL control channel without ambiguity.

Option A-2) UE ID or implicit value from the UE ID: If the seed value of the DMRS sequence is determined by the cell ID as in Option A-1, CoMP transmission between eNBs or between TRPs may not be well supported. Therefore, an additional value (e.g., a virtual cell ID), without being limited to a specific cell ID, may be used as the seed value of the DMRS sequence to properly support a CoMP operation. However, it is difficult for a network to transmit the seed value of the control channel DMRS sequence to the UE before an additional virtual cell ID is configured for the UE. Therefore, the UE assumes a UE ID thereof or a value derived by a function of the UE ID as the seed value of the DMRS sequence and performs channel estimation for the control channel using the DMRS of the control channel.

Option A-3) Beam index or beam ID: If the network transmits multiple beams and transmits the control channel, the data channel, and then synchronization signal using beam sweeping, the UE may determine a preferred beam index or beam ID and report the determined beam index or beam ID to the eNB, or report the best beam ID or the most preferred beam ID using an RSRP for specific beam IDs or a metric corresponding the RSRP. The UE may assume that the seed of the DMRS needed to receive the control channel is determined based on a beam ID selected by the UE or a beam ID indicated by the eNB in an RACH procedure. The UE performs channel estimation for the control channel using the DMRS of the control channel under the assumption that the beam ID is the seed value of the DMRS of the control channel. If the seed value of the DMRS sequence is configured using the beam ID, there is advantage in that the UE may specify from which beam interference is greatly generated in terms of inter-cell interference coordination (ICIC).

Option A-4) Value determined by a combination of some or all of Option A-1, Option A-2, and Option A-3.

B. A seed value of a DMRS sequence used by the UE to demodulate data may be determined by the following options. The difference between a method of configuring the seed value of the DMRS sequence used to demodulate data and a method of configuring the seed value of the DMRS sequence used to demodulate the control channel is that the seed value of the DMRS sequence used to demodulate the data may be signaled through a DL control indicator or DL control information (DCI). A seed value applied among the following operations may be signaled through the DCI. Likewise, information about a seed value of a DMRS to be used to generate a DMRS sequence associated with UL data or a UL control signal/channel, or a root index to be used by the UE when the DMRS sequence is a CAZAC based sequence may be indicated to the UE through the DCI. The UE generates the DMRS sequence using a value indicated to the UE and transmits the UL data/control channel. A value which is to be signaled as an initial seed value of the DMRS sequence may differ according to the types of sequences. For example, in the case of a Gold sequence based DMRS sequence, the initial seed value is signaled to the UE and, in the case of a CAZAC sequence, the root index is signaled to the UE. Hereinafter, the initial seed value will be used to denote a seed value for the Gold sequence based DMRS sequence and the root index will be used to denote a seed value for the CAZAC sequence based DMRS sequence.

Option B-1) Cell ID or value derived by a function of the cell ID: Option B-1 is the simplest and definite method in determining the seed value of the DMRS sequence. Since the UE uses a cell ID detected thereby to demodulate DL data and transmit a UL data/control DMRS, the UE may demodulate the DL data without ambiguity and generate and transmit the UL data/control DMRS.

Option B-2) UE ID or implicit value from the UE ID: If the seed value of the DMRS sequence is determined by the cell ID as in Option B-1, CoMP transmission between eNBs or between TRPs may not be well supported. Therefore, an additional value (e.g., a virtual cell ID), without being limited to a specific cell ID, may be used as the seed value of the DMRS sequence to properly support a CoMP operation. However, it is difficult for the network to transmit the seed value of the DMRS sequence for the DL data channel and the seed value of the DMRS sequence for the UL data/control channel to the UE before an additional virtual cell ID is configured for the UE through higher-layer signaling. Therefore, the UE assumes a UE ID thereof or a value derived by a function of the UE ID as the seed value of the DMRS sequence and performs channel estimation using the DMRS of the DL data channel. For UL data/control channel DL-RS transmission, the UE generates and transmits the DMRS sequence using the UE ID or the value derived from a function of the UE ID.

Option B-3) Beam index or beam ID: If the network transmits multiple beams and transmits the control channel, the data channel, and then synchronization signal using beam sweeping, the UE may determine a preferred beam index or beam ID and report the determined beam index or beam ID to the eNB, or report the best beam ID or the most preferred beam ID using an RSRP for specific beam IDs or a metric corresponding the RSRP. The UE may assume that the seed of the DMRS needed to receive the DL data channel is determined based on a beam ID selected by the UE or a beam ID indicated by the eNB in an RACH procedure. The UE may perform channel estimation for the data channel using the DMRS of the data channel under the assumption that the beam ID is the seed value of the DMRS of the data channel. If the seed value of the DMRS sequence is configured using the beam ID, there is advantage in that the UE may specify from which beam interference is greatly generated in terms of ICIC. Similarly, the UE generates and transmits the DMRS sequence using the beam ID or a value determined by a function of the beam ID, in transmitting the UL data/control DMRS.

Option B-4) Value determined by a combination of some or all of Option B-1, Option B-2, and Option B-3.

C. When the UE fails to acquire information about the seed of the DMRS sequence of the control channel or additional information about the search space (given mainly through RRC signaling), scrambling for the control channel itself should be specified. That is, the UE should also be aware of scrambling information about the control channel. An initial value (i.e., a seed value) used for scrambling of the control channel may be determined by one of the following candidates.

Option C-1) Cell ID or value derived by a function of the cell ID: Similar to Option A-1 or Option B-1 for configuring the seed of the DMRS sequence based on the cell ID, Option C-1 may determine scrambling of the control channel simply and definitely. The UE may receive the DL control channel under the assumption that the DL control channel has been scrambled based on the cell ID detected thereby without ambiguity.

Option C-2) UE ID or implicit value from the UE ID: If the seed value of scrambling is determined by the cell ID as in Option C-1, CoMP transmission between eNBs and between TRPs may not be well supported. Accordingly, an additional value (e.g., a virtual cell ID), without being limited to a specific cell ID, may be used as the seed value of scrambling to properly support a CoMP operation. However, it is difficult for the network to transmit the seed value of scrambling to the UE before the UE receives a configuration for an additional virtual cell ID. Therefore, the UE receives the control channel under the assumption that the UE ID thereof or a value derived by a function of the UE ID as the seed value of scrambling.

Option C-3) Beam index or beam ID: If the network transmits multiple beams and transmits the control channel, the data channel, and then synchronization signal using beam sweeping, the UE may determine a preferred beam index or beam ID and report the determined beam index or beam ID to the eNB, or report the best beam ID or the most preferred beam ID using an RSRP for specific beam IDs or a metric corresponding the RSRP. The UE may assume that the DL control channel has been transmitted through scrambling based on a beam ID selected by the UE or a beam ID indicated by the eNB in an RACH procedure. Therefore, the UE acquires control information by descrambling the DL control channel using the beam ID.

Option C-4) Value determined by a combination of some or all of Option B-1, Option B-2, and Option B-3.

D. A seed value for scrambling of a DL/UL data channel and a UL control channel of the UE may be determined by the following options. The network/eNB may signal a DMRS seed value different from the seed value of scrambling of the DL control channel. The network/eNB may signal seed value(s) applied to the DL data channel, the DMRS, the UL data channel, and/or the UL control channel among the following operations through DCI. The UE may receive data by performing descrambling for DL data using an indicated or used scrambling seed value. Information about a DMRS seed value to be used to generate a DMRS sequence associated with the UL data or the UL control signal/channel may be indicated to the UE through the DCI. The UE scrambles the UL data/control channel using the seed value indicated to the UE. Advantages and disadvantages of each option and characteristics of each option are similar to those described in Options A, B, and C.

Option D-1) Cell ID.
Option D-2) UE ID or an implicit value from the UE ID.
Option D-3) Beam index.
Option D-4) Value determined by a combination of some or all of Option D-1, Option D-2, and Option D-3.

Default value(s) which are to be used as the seed value of the DMRS of the control channel and the data channel, and/or the seed value for scrambling the control channel and the data channel until the UE receives an RRC configuration may be transmitted to UE(s) through a channel carrying system information, such as RMSI, RAR, or paging, which is detected/received after the UE(s) detect/receive a PBCH. In UL, the default value(s) may be applied to UL channels until the UE receives an additional RRC configuration after transmitting RA Msg1.

Default Control Channel Search Space and CSI Reporting Mode

A UE may be implicitly aware of a search space in which BD for a control channel is to be performed, using system bandwidth information obtained by a PBCH or additionally using a function of a cell ID. Alternatively, information about a bandwidth, a configuration, and/or a timing of a default search space of the UE may be signaled through the PBCH and an index of a control channel element (CCE) in which the control channel can be positioned, i.e., a location at which the control channel can be transmitted in a given frequency range, should be predetermined between the UE and the eNB in a system. If a default search space is defined in the system, the default search space may be commonly applied to all UEs. Herein, the default search space refers to a search space in which the UE performs BD for the control channel in order to receive the system information after the UE receives the PBCH.

However, if a common control channel is not transmitted and there is no restriction indicating that one control channel should be transmitted for a plurality of UEs, the default search space may be a UE-specific default search space rather than a default search space of the system. That is, every UE may have the default search space. In this case, a frequency position, a CCE position, or a CCE number, in which the control channel can be actually transmitted, may be UE-specifically determined. For example, a frequency resource of the control channel may be determined by a function of a UE ID. The UE-specific default search space is desirably spread in a broad band or a specific band. The UE-specific default search space differs from a cell-common default search space. Two types of default search spaces, i.e., the cell-common default search space for reception of the system information by the UE and the UE-specific default search space for reception of UE-dedicated data, may be configured for the UE. The cell-common default search space may correspond to a common search space of the legacy LTE system. However, the UE-specific default search space differs from a UE-specific search space of the LTE system, determined by an RRC configuration. The UE-specific default search space of the present invention means a search space which is configured for a UE to receive UE-dedicated data prior to RRC configuration. The broad band or the specific band in which the UE-specific default search space is configured may be a specific subband limited to each UE or to a specific service and/or a use case. Information about a frequency band in which the UE-specific default search space is configured may be acquired when the UE performs initial access or an RACH procedure. If a plurality of services and/or use cases are provided subband-wise within a single NR carrier, a default search space limited to a specific subband within a corresponding carrier bandwidth may be present.

Figure 11:
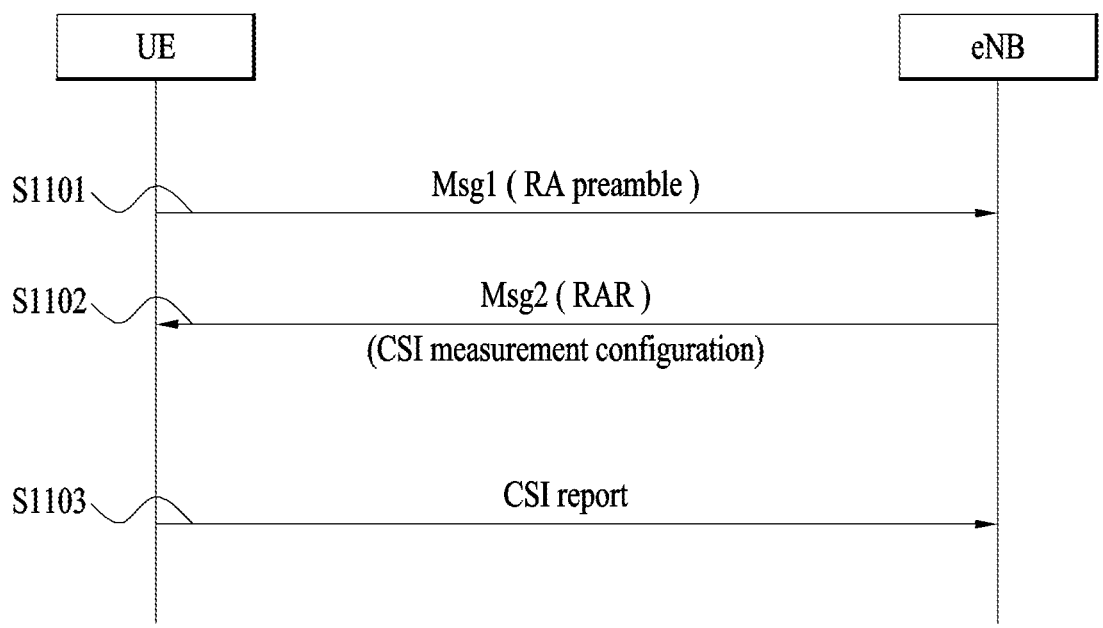
FIG. 11 illustrates a method of configuring a resource for CSI measurement according to the present invention.
Figure 12:
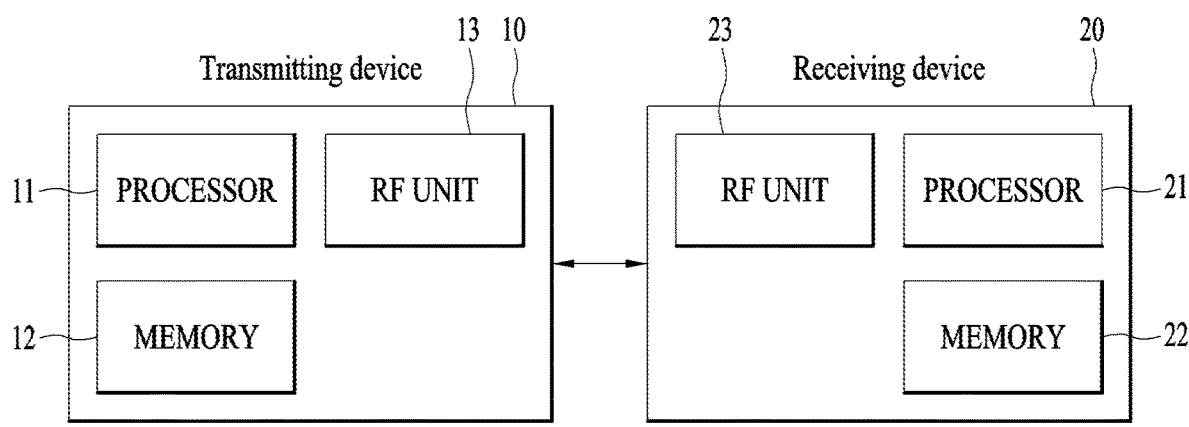
FIG. 12 is a block diagram illustrating elements of a transmitting device 10 and a receiving device 20 for implementing the present invention.

FIG. 11 illustrates a method of configuring a resource for CSI measurement according to the present invention.

Similarly, a default CSI-RS configuration is needed even for an operation in which the UE measures and reports CSI for a DL channel. Generally, since a CSI-RS configuration includes the position of a CSI-RS, the position of a CSI-IM resource associated with the CSI-RS, a CSI-RS resource, a CSI process associated with the CSI-IM resource, and QCL assumption, there is much information related to the CSI-RS configuration and the information is provided to the UE through RRC signaling. In this case, the UE is not aware of CSI-RS configuration information for the UE until the UE establishes an RRC connection with the eNB. In the LTE system, the UE have performed CSI feedback using a CRS present in every subframe. However, in the NR system in which an RS which is always transmitted like the CRS is not used, if the UE fails to receive RRC signaling related to the CSI-RS configuration, CSI feedback cannot be properly performed. Accordingly, in a system in which an RS, the presence of which is guaranteed in every subframe, is not present, a default CSI configuration should be defined.

Generally, upon successfully receiving Msg1 while an RACH procedure is performed, the eNB may report CSI information to the UE in order to determine an MCS for Msg4 transmission upon transmission of an RAR (i.e., Msg2) as a response to Msg1. The present invention proposes that the eNB provide information to a UE as to what RS the UE should use for calculating CSI, i.e., default CSI measurement configuration information. Default CSI for CSI calculation may be determined among the following candidates.

CSI-RS
Secondary synchronization signal (SSS)
PBCH DMRS
PDCCH/PDSCH DMRS
PDSCH quality When the CSI-RS is used for a CSI report, information which should be included in the default CSI-RS configuration is as follows.

The number of CSI-RS ports and positions of CSI-RS resources/the number and positions of CSI-IM resources/CSI reporting mode, and type and amount of CSI information to be reported/amount and positions of CSI reporting resources Such information may be provided through a system information block (SIB) obtained after the UE detects a synchronization signal such as a PSS/SSS and then decodes a PBCH. Herein, the SIB may be a block of minimum system information (SI) indispensable for cell access and/or a block of other SI. The UE may acquire the SIB at the position of a time/frequency resource on which the PSS/SSS is detected or a position indicated by the PBCH. The SIB may be transmitted in a predetermined or fixed time/frequency region. Alternatively, the network may transmit information about a default CSI process through timing/resources/signaling through which the UE acquires a PRACH resource configuration. The default CSI process may be fixed through scheduling in the system. Together with information about the CSI-RS configuration and/or the CSI process, the ratio between CSI-RS transmission power and PDSCH transmission power may also be signaled. The network/eNB may command the UE to perform a CSI report through an RAR message. The SIB may include information about a plurality of default CSI-RS configurations. The network/eNB may command the UE to perform the CSI report through the RAR message by indicating a specific CSI-RS/CSI-IM.

The UE measures the CSI using the CSI-RS and CSI-IM indicated through the RAR message and reports the CSI through Msg3 or through a specific resource indicated by the network/eNB. If a plurality of CSI-RS/CSI-IM configurations is indicated by an RAR, the UE may report CSI for all CSI-RS and CSI-IM pairs or CSI for the best CSI-RS and CSI-IM pair per UE by default. The network/eNB may indicate the number of CSIs to be reported to the UE through the RAR message. In this case, the CSI is derived based on a specific CSI-RS and CSI-IM pair, i.e., measurement for a specific CSI-RS resource and a specific CSI-IM resource. The CSI may be a one-shot measurement result measured only at a timing at which a corresponding RS is transmitted, i.e., at a timing at which a corresponding CSI-RS and CSI-IM pair is present. If it is desired to measure the CSI-RS/CSI-IM at multiple timings and report CSI for an averaging result, the network/eNB may indicate whether one-shot measurement for the CSI is performed. The UE reports a CSI value obtained through one-shot measurement or a CSI value of an average on the time domain according to signaling of the network/eNB.

The network/eNB may transmit the default CSI-RS configuration to the UE through the RAR message. Referring to FIG. 11, if the UE transmits RA Msg1 (S1101), the network/eNB may transmit, as a response to Msg1, CSI-RS configuration information, and CSI-IM resource information indicating an interference measurement position, through an RAR (S1102). Then, the UE measures CSI using a corresponding CSI-RS and a CSI-IM resource and reports the measurement result through Msg3 or through a specific resource indicated by the network/eNB (S1103). If a plurality of CSI-RS and CSI-IM pairs is indicated through the RAR, the UE may report CSI for all CSI-RS and CSI-IM pairs or CSI for the best CSI-RS and CSI-IM pair by default. The network/eNB may indicate how many CSIs will be used for a report through the RAR message. In this case, the CSI is measurement for a specific CSI-RS and CSI-IM pair and may be a one-shot measurement result measured only at a timing at which a corresponding RS is transmitted, i.e., at a timing at which a corresponding CSI-RS and CSI-IM pair is present. If it is desired to measure the CSI-RS/CSI-IM at multiple timings and report CSI for an averaging result, the network/eNB may indicate whether one-shot measurement for the CSI is performed. The UE reports a CSI value obtained through one-shot measurement or a CSI value of an average on the time domain according to signaling of the network/eNB.

According to the above-described method, the network/eNB may trigger a CSI report to the UE by transmitting a CSI-RS configuration through a PDSCH carrying the RAR. That is, if the RAR includes the CSI-RS configuration, the CSI report is interpreted as being triggered even if there is no CSI request field for triggering the CSI report. The CSI request field may be included in UL DCI for scheduling a PUSCH or in an RAR grant for scheduling the PDSCH carrying the RAR.

As another method, the eNB that has successfully received Msg1 may transmit DCI for triggering aperiodic CSI, using an RA-RNTI within a monitoring window for the RAR which is a response to Msg1. The network/eNB may inform the UE of a timing, a symbol number, a transmission band, and port information, related to transmission of the aperiodic CSI, through the DCI or the PDSCH that the DCI schedules. Alternatively, the network/eNB may transmit aperiodic CSI-RS configuration information through the PDSCH that the DCI schedules. Additionally, the network/eNB may inform the UE of information about the ratio between CSI-RS transmission power and PDSCH transmission power. The UE measures the CSI at a timing at which a corresponding aperiodic CSI-RS is transmitted and, if there is a CSI request through the RAR, the UE reports the CSI on a resource designated by the RAR or during Msg3 transmission.

The DCI or aperiodic CSI-RS information may be transmitted in the RAR. Upon receiving the RAR including such information, the UE measures a corresponding CSI-RS and reports the measurement result through Msg3 because the UE has received the aperiodic CSI-RS information.

However, if aperiodic CSI-RS related information has been transmitted through additional DCI, the UE may miss the DCI. If there is a CSI request through the RAR even when the UE has not received the DCI including the aperiodic CSI-RS related information, the UE may report a Not Available value during Msg3 transmission as CSI, report a value indicating that the CSI-RS has not been measured, or report the CSI using one channel/signal among default RSs for the CSI (e.g., CSI-RS, SSS, PBCH DMRS, PDCCH/PDSCH DMRS, and PDSCH qualities).

An RS for default CSI calculation may be one of an SSS, a PBCH DMRS, a PDSCH signal-to-noise ratio (SNR), and a PDSCH bit error rate (BER), unless configured or signaled separately. Alternatively, a combination of these candidate signals/channels may be used for default CSI measurement. For example, a combination of the SSS, PBCH DMRS, and PBCH qualities may be used for default CSI calculation and an RS for default CSI calculation may be designated as the SSS, PBCH, and PBCH DMRS qualities constituting the same SS block. Which signal is used for default CSI calculation may be specified in the standard document. In addition to a signal for default CSI calculation, a CSI-RS configuration may be provided using the RAR as described above so that the UE may perform CSI-RS measurement.

When the network transmits the CSI request to the UE to determine an MCS for Msg4 transmission, an SSS may be used as a signal for calculating the CSI. For example, unless configured separately, the UE may report a received SNR value of the SSS to the network. In the NR system, upon transmitting an RACH, the UE will target a specific cell and a specific beam. The UE may report the ratio of received signal strength of all signals to received signal strength of an SSS corresponding to a specific beam of a corresponding cell. However, if an SSS transmission band differs from an RACH Msg4 transmission band, an SNR value using the SSS may not aid in determining an MCS for RACH Msg4 transmission due to inaccuracy of the SNR value. Therefore, the UE may report a corresponding value using a received SNR value of a PBCH DMRS transmitted in a broader band. Alternatively, the UE may report a received SNR value obtained by combining the SSS and the PBCH DMRS. If there is a CSI request through the RAR, the network/eNB may indicate a beam direction in which the CSI is measured, a specific beam index/direction, or an SS block index. Unless indicated separately, the UE measures CSI for an SS block index connected to Msg1 that the UE has transmitted or for a specific beam index/direction and reports the measurement result. Information about the ratio of SSS transmission power to PDSCH transmission power, the ratio of PBCH DMRS transmission power to PDSCH transmission power, and the ratio of SSS transmission power to PBCH DMRS transmission power is separately signaled to the UE. If no signaling is transmitted, the UE may assume these power ratios as a specific value. For example, the UE may calculate the CSI under the assumption that these power ratios are 1.

The UE may use a PDCCH DMRS and/or a PDSCH DMRS (PDCCH/PDSCH DMRS) to calculate the default CSI. Herein, the PDCCH/PDSCH DMRS refers to a PDCCH/PDSCH DMRS used for minimum SI, accurately, for remaining minimum SI, and means a cell-commonly or beam-commonly transmitted DMRS. Herein, the minimum SI refers to essential SI when the UE accesses the network in NR. Among the minimum SI, the essential information is transmitted through a PBCH and information which is not transmitted through the PBCH is referred to as the remaining minimum SI (RMSI). The UE may access the network by performing a random access procedure only after the UE receives up to the RMSI. A PDCCH/PDSCH is transmitted for at least SI transmission. Since the PDCCH/PDSCH for SI transmission is transmitted to a plurality of UEs, there is a high probability of being transmitted in a relatively broad band. Similar to the SS block, the SI should cover the entire cell and, therefore, will be transmitted through beam sweeping. The PDCCH/PDSCH DMRS may include information about beams. In this case, a received SNR value of the PDCCH/PDSCH DMRS may be used as a default CSI value. That is, a DMRS for the SI may be used for CSI calculation. In this case, information about the ratio of the PDCCH/PDSCH DMRS power to PDSCH power is signaled to the UE. If the network/eNB transmits the CSI request through the RAR, the UE reports, as a CSI value, a received SNR value of the PDCCH/PDSCH DMRS corresponding to an SS block index connected to Msg1 that the UE has transmitted or a specific beam index/direction.

The UE may use PDCCH quality or PDSCH quality to calculate the default CSI. If the UE receives a PDCCH related to a PDSCH carrying the minimum SI and successfully decodes the PDCCH, the UE may calculate the CSI according to the quality of a decoded signal. If the UE receives the PDCCH related to the PDSCH carrying the minimum SI and successfully decodes the PDCCH, the UE may calculate the CSI according to the quality of a decoded signal. Alternatively, if the UE has successfully received the RAR, i.e., after the UE has successfully received the PDSCH of Msg2 and has successfully decoded the PDSCH, the UE may calculate CSI according to the quality of a decoded signal. That is, the received quality of the SI may be used to calculate the CSI. The UE may simply calculate CSI using a BER and derive the CSI using a modulation symbol by modulating the decoded signal or decoded bits again.

Multiple UE Search Spaces

In the NR system, after receiving configurations such as a search space and a virtual cell ID for control channel reception, the UE may operate as follows.

If the UE receives a control channel using a default ID and a default search space for control channel reception, then the UE may additionally receive an initial value (i.e., seed value) for a control channel DMRS at any specific timing. In this case, the UE may receive a plurality of IDs (hereinafter, virtual cell IDs) and a UE search space may be configured for each of the plural IDs. That is, a plurality of UE search spaces may be configured for the UE. The plural UE search spaces may be configured according to the following option(s).

1) Multiple search spaces are independently configured. Regardless of configurations of different search spaces, the UE receives a plurality of search space configurations. Since the multiple search spaces are independently configured, partial regions of the search spaces configured for the UE may overlap or may not overlap at all.

2) Multiple search spaces are orthogonally configured. That is, the multiple search spaces are configured not to overlap. Different search spaces may not overlap and may be orthogonally configured. That is, the search spaces may be configured by a CCE in which the search spaces do not overlap.

3) Multiple search spaces may be distinguished by a specific region. For example, a search space may be defined per subband. Alternatively, the search spaces may be configured by CCE indexes of a predetermined range.

When multiple UE search spaces are configured, at least one of the multiple UE search spaces is configured in the form of being spread in a broad band or a specific band. If analog beamforming is applied, an additional search space per beam may be configured. If the UE has a plurality of search spaces, the search spaces of the UE may additionally be determined by a function of a beam index.

Seed of DL control DMRS sequence: A virtual cell ID configured for the UE is used as a seed value of a sequence. Virtual cell IDs are connected to the search spaces, respectively. A virtual cell ID which is tied with a specific search space is used as a seed value of the DMRS sequence.

Seed values of DL/UL data and UL control channel DMRS sequences: The UE may receive a plurality of DMRS sequence seed values through higher-layer signaling. A value actually used for a DMRS sequence is directly signaled to the UE through DCI. A virtual cell ID which is to be used for DL data may be designated by a DL grant and a virtual cell ID which is to be used for UL data and a UL control signal may be designated by a UL grant. If the eNB designates the virtual cell ID through the UL grant, a UL data DMRS seed and a UL control DMRS seed may be independently designated. A virtual cell ID used for a DL control channel may differ from a DMRS sequence seed value for data demodulation. If the DMRS sequence is a CAZAC based sequence, a root index to be used by the UE may be indicated to the UE through the DCI. The UE may generate the DMRS sequence using the indicated value and transmits the DMRS sequence together with a UL data/control signal.

DL control channel scrambling: A scrambling sequence may be initialized based on a virtual cell ID. A virtual cell ID tied with each search space is applied to DL control channel scrambling.

Seed value for scrambling for UL/DL data and UL control channel: The UE may receive a seed value for scrambling a plurality of data channels through higher-layer signaling. The eNB directly signals a value used for actual data scrambling to the UE through the DCI. A seed value of a virtual cell ID used for a control channel may differ from a seed value for data scrambling.

TPC Command

Hereinafter, a method of transmitting a transmit power control (TPC) command for UL power control in the NR system will be proposed. The eNB may transmit a ramping-up or ramping-down command for a UL signal/channel which is periodically transmitted. When an analog beam is applied and/or when the eNB provides a service using multiple beams, a different TPC RNTI per beam ID may be configured for the UE. For example, a TPC RNTI per beam may be automatically designated as a function of a beam ID. One TPC index for group TPC command DCI per beam, i.e., only one TPC bit position in DCI, may be commonly allocated to the UE. In other words, the eNB may transmit a TPC command for a plurality of grouped UEs. For example, the eNB may group specific UEs using a specific TPC RNTI, designate a bit position in the DCI using the TPC RNTI with respect to each UE, and transmit the DCI by setting a bit value of the bit position, so that the eNB may transmit a power-up or power-down command to a plurality of UEs. In a multi-beam environment, the UE attempts to detect the group TPC command DCI based on a TPC RNTI corresponding to a serving beam ID thereof. If the UE successfully detects the group TPC command DCI, the UE receives a TPC command thereof from the DCI using the TPC RNTI through the TPC index allocated thereto and applies the TPC command to power control. If a serving beam is changed, the UE may derive a TPC RNTI corresponding to a serving beam index and receive the TPC command using the TPC RNTI.

The TPC command using the TPC RNTI may be transmitted in a different search space per beam ID. The UE may acquire the TPC command using the TPC RNTI.

FIG. 11 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may generate a CRS and/or a DL DMRS using a seed value according to the present invention. The eNB processor may scramble a PDCCH, an EPDCCH, and/or a PDSCH using the seed value according to the present invention. The eNB processor may control the eNB RF unit to transmit the CRS, the DL DMRS, the PDCCH, the EPDCCH, and/or the PDSCH. The eNB processor may control the eNB RF unit to receive a PUCCH DMRS and/or a PUSCH DMRS. The eNB processor may detect the PUCCH DMRS and/or the PUSCH DMRS using the seed value according to the present invention. The UE processor may control the UE RF unit to receive the CRS, the DL DMRS, the PDCCH, the EPDCCH, and/or the PDSCH. The UE processor may detect the CRS and/or the DL DMRS using the seed value according to the present invention. The UE processor may descramble the PDCCH, the EPDCCH, and/or the PDSCH using the seed value according to the present invention. The UE processor may generate the PUCCH DMRS and/or the PUSCH DMRS using the seed value of the present invention. The UE processor may control the UE RF unit to transmit the PUCCH DMRS and/or the PUSCH DMRS.

The eNB processor may configure a default search space according to the present invention. The eNB processor may control the eNB RF unit to transmit configuration information of the default search space according to the present invention. The eNB processor may control the eNB RF unit to transmit a control channel in the default search space which is configured according to the present invention. The eNB processor may configure a signal and/or a resource for measuring default CSI according to the present invention. The eNB processor may control the eNB RF unit to transmit configuration information for the signal and/or the resource for measuring the default CSI through an RAR. The eNB processor may control the eNB RF unit to transmit a CSI request through DCI or the RAR. The eNB processor may control the eNB RF unit to receive CSI corresponding to the CSI request. The UE processor may control the UE RF unit to receive the configuration information in the default search space configured according to the present invention. The UE processor may attempt to detect a control channel in the default search space, based on the configuration information of the default search space according to the present invention. The UE processor may receive the configuration information for the signal and/or the resource for measuring the default CSI according to the present invention. The UE processor may control the UE RF unit to receive the configuration information for the signal and/or the resource for measuring the default CSI through the RAR. The UE processor may control the UE RF unit to receive the CSI request through the DCI or the RAR. The UE processor may derive the CSI based on the configuration information for the signal and/or the resource for measuring the default CSI. The UE processor may control the UE RF unit to report the CSI.

As described above, the detailed description of the preferred examples of the present invention has been given to enable those skilled in the art to implement and practice the invention. Although the invention has been described with reference to exemplary examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The examples of the present invention are applicable to a base station, a user equipment, or other devices in a wireless communication system.

The invention claimed is:

1. A method of transmitting channel state information (CSI) by a user equipment in a wireless communication system, the method comprising:
transmitting a random access preamble;
receiving, via a physical downlink shared channel (PDSCH), a random access response in response to the random access preamble; and
performing a CSI report,
wherein the PDSCH is scheduled by a physical downlink control channel (PDCCH) including downlink control information (DCI),
wherein the CSI report is triggered based on one of the PDSCH including the random access response or the PDCCH including the DCI,
wherein based on the DCI including a CSI request for the CSI report, the triggering of the CSI report is determined based on the CSI request,
wherein based on the DCI not including the CSI request for the CSI report, the triggering of the CSI report is determined based on that the random access response includes CSI measurement configuration information, and
wherein based on the triggering of the CSI report being determined based on that the random access response includes the CSI measurement configuration information:
the CSI measurement configuration information includes information on a plurality of CSI-reference signal (CSI-RS) configurations;
CSI-RS configurations to be used for CSI measurement among the plurality of CSI-RS configurations are determined based on whether a number of CSI-RS configurations to be used for the CSI measurement is indicated by the random access response;
all of the plurality of CSI-RS configurations are used for the CSI measurement, based on that the number of CSI-RS configurations to be used for the CSI measurement is not indicated by the random access response; and
CSI-RS configurations of an indicated number among the plurality of CSI-RS configurations are used for the CSI measurement, based on that the number of CSI-RS configurations to be used for the CSI measurement is indicated by the random access response.

2. The method of claim 1, further comprising:
calculating the CSI, based on received quality of a CSI reference signal (CSI-RS), a synchronization signal, a demodulation reference signal for receiving a physical broadcast channel, a demodulation reference signal for receiving system information, or system information,
wherein the CSI report includes the calculated CSI.

3. The method of claim 1,
wherein based on the DCI including the CSI request for the CSI report, the CSI report is performed based on the CSI request.

4. A user equipment for transmitting channel state information (CSI) in a wireless communication system, the user equipment comprising:
a radio frequency (RF) transceiver; and
a processor configured to control the RF transceiver, wherein the processor is further configured to:
control the RF transceiver to transmit a random access preamble;
control the RF transceiver to receive, via a physical downlink shared channel (PDSCH), a random access response in response to the random access preamble; and
control the RF transceiver to perform a CSI report,
wherein the PDSCH is scheduled by a physical downlink control channel (PDCCH) including downlink control information (DCI),
wherein the CSI report is triggered based on one of the PDSCH including the random access response or the PDCCH including the DCI, wherein based on the DCI including a CSI request for the CSI report, the triggering of the CSI report is determined based on the CSI request, wherein based on the DCI not including the CSI request for the CSI report, the triggering of the CSI report is determined based on that the random access response includes CSI measurement configuration information, and wherein based on the triggering of the CSI report being determined based on that the random access response includes the CSI measurement configuration information:

the CSI measurement configuration information includes information on a plurality of CSI-reference signal (CSI-RS) configurations;

CSI-RS configurations to be used for CSI measurement among the plurality of CSI-RS configurations are determined based on whether a number of CSI-RS configurations to be used for the CSI measurement is indicated by the random access response;

all of the plurality of CSI-RS configurations are used for the CSI measurement, based on that the number of CSI-RS configurations to be used for the CSI measurement is not indicated by the random access response; and CSI-RS configurations of an indicated number among the plurality of CSI-RS configurations are used for the CSI measurement, based on that the number of CSI-RS configurations to be used for the CSI measurement is indicated by the random access response.

5. The user equipment of claim 4, wherein the processor is configured to calculate the CSI, based on received quality of a CSI reference signal (CSI-RS), a synchronization signal, a demodulation reference signal for receiving a physical broadcast channel, a demodulation reference signal for receiving system information, or system information, and wherein the CSI report includes the calculated CSI.

6. The user equipment of claim 4, wherein based on the DCI including the CSI request for the CSI report, the CSI report is performed based on the CSI request.

7. A method of receiving channel state information (CSI) by a base station in a wireless communication system, the method comprising:

receiving a random access preamble from a user equipment;

transmitting, via a physical downlink shared channel (PDSCH), a random access response in response to the random access preamble to the user equipment; and receiving a CSI report from the user equipment, wherein the PDSCH is scheduled by a physical downlink control channel (PDCCH) including downlink control information (DCI), wherein the CSI report is triggered based on one of the PDSCH including the random access response or the PDCCH including the DCI, wherein based on the DCI including a CSI request for the CSI report, the triggering of the CSI report is determined based on the CSI request, wherein based on the DCI not including the CSI request for the CSI report, the triggering of the CSI report is determined based on that the random access response includes CSI measurement configuration information, and wherein based on the triggering of the CSI report being determined based on that the random access response includes the CSI measurement configuration information:

the CSI measurement configuration information includes information on a plurality of CSI-reference signal (CSI-RS) configurations;

CSI-RS configurations to be used for CSI measurement among the plurality of CSI-RS configurations are determined based on whether a number of CSI-RS configurations to be used for the CSI measurement is indicated by the random access response;

all of the plurality of CSI-RS configurations are used for the CSI measurement, based on that the number of CSI-RS configurations to be used for the CSI measurement is not indicated by the random access response; and CSI-RS configurations of an indicated number among the plurality of CSI-RS configurations are used for the CSI measurement, based on that the number of CSI-RS configurations to be used for the CSI measurement is indicated by the random access response.

8. A base station for receiving channel state information (CSI) in a wireless communication system, the base station comprising:

a radio frequency (RF) transceiver; and a processor configured to control the RF transceiver, wherein the processor is further configured to:

control the RF transceiver to receive a random access preamble from a user equipment;

control the RF transceiver to transmit, via a physical downlink shared channel (PDSCH), a random access response in response to the random access preamble to the user equipment; and control the RF transceiver to receive a CSI report from the user equipment, wherein the PDSCH is scheduled by a physical downlink control channel (PDCCH) including downlink control information (DCI), wherein the CSI report is triggered based on one of the PDSCH including the random access response or the PDCCH including the DCI, wherein based on the DCI including a CSI request for the CSI report, the triggering of the CSI report is determined based on the CSI request, wherein based on the DCI not including the CSI request for the CSI report, the triggering of the CSI report is determined based on that the random access response includes CSI measurement configuration information, and wherein based on the triggering of the CSI report being determined based on that the random access response includes CSI measurement configuration information:

the CSI measurement configuration information includes information on a plurality of CSI-reference signal (CSI-RS) configurations;

CSI-RS configurations to be used for CSI measurement among the plurality of CSI-RS configurations are determined based on whether a number of CSI-RS configurations to be used for the CSI measurement is indicated by the random access response;

all of the plurality of CSI-RS configurations are used for the CSI measurement, based on that the number of CSI-RS configurations to be used for the CSI measurement is not indicated by the random access response; and CSI-RS configurations of an indicated number among the plurality of CSI-RS configurations are used for the CSI measurement, based on that the number of CSI-RS configurations to be used for the CSI measurement is indicated by the random access response.

* * * * *